(12) United States Patent
Hayakawa et al.

(10) Patent No.: US 7,109,727 B2
(45) Date of Patent: Sep. 19, 2006

(54) CAPACITIVE PHYSICAL QUANTITY SENSOR

(75) Inventors: Junji Hayakawa, Okazaki (JP); Norio Kitao, Shinshiro (JP); Akinobu Umemura, Nagoya (JP); Hirokazu Ito, Oobu (JP); Takaaki Kawai, Oobu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/227,983

(22) Filed: Sep. 16, 2005

(65) Prior Publication Data

US 2006/0061372 A1 Mar. 23, 2006

(30) Foreign Application Priority Data

Sep. 17, 2004 (JP) .............................. 2004-271372

(51) Int. Cl.
G01R 27/26 (2006.01)
G01P 21/00 (2006.01)

(52) U.S. Cl. ..................... 324/679; 73/1.38; 73/514.32

(58) Field of Classification Search ................. 324/679
See application file for complete search history.

(56) References Cited

U.S. PATENT DOCUMENTS 5,103,667 A * 4/1992 Allen et al. ................... 73/1.38

| | | | |
|---|---|---|---|
| 5,633,594 A | 5/1997 | Okada | |
| 6,257,061 B1 | 7/2001 | Nonoyama et al. | |
| 6,668,614 B1 | 12/2003 | Itakura | |

FOREIGN PATENT DOCUMENTS

| JP | 8-145717 | 6/1996 |
|---|---|---|
| JP | 2000-81449 | 3/2000 |
| JP | 2003-121457 | 4/2003 |

* cited by examiner

*Primary Examiner*—Vincent Q. Nguyen
(74) *Attorney, Agent, or Firm*—Posz Law Group, PLC

(57) ABSTRACT

In a capacitive physical quantity sensor, a C-V converter converts a variation in a capacitance between a movable electrode and a fixed electrode into a voltage to output the converted voltage in a first operating mode. The C-V converter also outputs a constant voltage in a second operating mode. An amplifier amplifies the converted voltage to output a first voltage, and amplifies the constant voltage to output a second voltage. A first sample and hold circuit operates in the first operating mode to sample and hold the first voltage. A second sample and hold circuit operates in the second operating mode to sample and hold the second voltage. A first differential amplifier obtains a difference voltage between the first voltage held by the first sample and hold circuit and the second voltage held by the second sample and hold circuit.

20 Claims, 10 Drawing Sheets

US 7,109,727 B2

CAPACITIVE PHYSICAL QUANTITY SENSOR

CROSS REFERENCE TO RELATED APPLICATIONS

This application is based on Japanese Patent Application 2004-271372 filed on Sep. 17, 2004. This application claims the benefit of priority from the Japanese Patent Application, so that the descriptions of which are all incorporated herein by reference.

FIELD OF THE INVENTION

The present invention relates to capacitive physical quantity sensors for detecting a physical quantity, such as an acceleration, an angular rate, a pressure or the like of a target.

BACKGROUND OF THE INVENTION

Capacitive physical quantity sensors, which have at least one movable electrode and at least one pair of fixed electrodes placed to be opposite thereto and sense a physical quantity of a target based on a capacitance between the movable electrode and the fixed electrodes, have been applied for vehicle's acceleration sensors.

As an example of such capacitive physical quantity sensors, the structure of a capacitive physical quantity sensor, which is disclosed in U.S. Pat. No. 6,257,061 corresponding to Japanese Patent Publication No. 2000-81449, is illustrated in FIG. 10.

The capacitive physical quantity sensor illustrated in FIG. 10 is provided with a capacitive physical quantity sensor element 110 composed of a movable electrode 111 and fixed electrodes 112a and 112b. The paired fixed electrodes 112a and 112b are placed to be opposite to the movable electrode 111. The capacitive physical quantity sensor is also provided with a C-V (Capacitance-to-Voltage) converter 120 for converting changes in capacitance sensed by the sensor element 110 into a corresponding voltage signal, thereby outputting the voltage signal.

Moreover, the capacitive quantity sensor is provided with a sample and hold circuit 130 configured to sample the value of the voltage signal at predetermined intervals of time and to hold each sampled value. Furthermore, the capacitive quantity sensor is provided with an amplifier 140 for amplifying a discrete voltage signal output from the sample and hold circuit 130, and a low pass filter (LPF) 170 for eliminating higher-order components contained in the amplified voltage signal therefrom.

A similar structure of a capacitive physical quantity sensor, which is substantially identical with that of the capacitive physical quantity sensor illustrated in FIG. 10, is disclosed in U.S. Pat. No. 6,668,614 corresponding to Japanese Patent Publication No. 2003-121457.

In addition, in U.S. Pat. No. 5,633,594 corresponding to Japanese Patent Publication No. H08-145717, the structure for eliminating the influence of an amplifier or a switching transistor is disclosed.

In order to amplify the minute voltage signal output from the C-V converter 20 of the capacitive physical quantity sensor illustrated in FIG. 10, the gain of the amplifier 40 can be set within the range from dozens of decibels to several hundred thereof. The gain characteristic of the amplifier 40 varies depending on change in ambient temperature.

For correcting the change of the gain characteristic of the amplifier 40 depending on change in ambient temperature, the gain characteristic of the amplifier 40 might be previously measured within a usable ambient temperature range so that the measured gain characteristic may have been stored in a memory unit, such as a ROM (Read Only Memory).

In addition, because of age deterioration of operating characteristics of the C-V converter 20, the sample and hold circuit 30, and the amplifier 40, measurement accuracy of the capacitive physical quantity sensor may deteriorate over time.

SUMMARY OF THE INVENTION

The present invention has been made on the background above so that at least one preferable embodiment of the present invention provides a capacitive physical quantity sensor whose operating characteristics of some of its components are not negatively influenced by age deterioration.

According to one aspect of the present invention, there is provided a capacitive physical quantity sensor includes a sensor element having a movable electrode and a fixed electrode opposite to the movable electrode. The movable electrode is displacable depending on change of a physical quantity. The capacitive physical quantity sensor includes a C-V converter configured to convert a variation in a capacitance between the movable electrode and the fixed electrode into a voltage to output the converted voltage in a first operating mode. The C-V converter is configured to output a constant voltage in a second operating mode.

The capacitive physical quantity sensor includes an amplifier connected to the C-V converter and configured to amplify the converted voltage to output an amplified first voltage. The amplifier is configured to amplify the constant voltage to output an amplified second voltage. The capacitive physical quantity sensor includes a first sample and hold circuit connected to the amplifier and configured to operate in the first operating mode to sample and hold the first voltage outputted from the amplifier.

The capacitive physical quantity sensor includes a second sample and hold circuit connected to the amplifier and configured to operate in the second operating mode to sample and hold the second voltage outputted from the amplifier. The capacitive physical quantity sensor includes a first differential amplifier connected to the first and second sample and hold circuits and configured to obtain a difference voltage between the first voltage held by the first sample and hold circuit and the second voltage held by the second sample and hold circuit.

According to another aspect of the present invention, there is provided a capacitive physical quantity sensor including a sensor element having a movable electrode and a fixed electrode opposite to the movable electrode. The movable electrode is displacable depending on change of a physical quantity. The capacitive physical quantity sensor includes a C-V converter configured to convert a variation in a capacitance between the movable electrode and the fixed electrode into a voltage to output the converted voltage in a first operating mode. The C-V converter is configured to output a constant voltage in a second operating mode.

The capacitive physical quantity sensor includes a first sample and hold circuit connected to the C-V converter and configured to operate in the first operating mode to sample and hold the converted voltage outputted from the C-V converter, and a second sample and hold circuit connected to the C-V converter and configured to operate in the second operating mode to sample and hold the constant voltage outputted from the C-V converter.

The capacitive physical quantity sensor includes a first differential amplifier connected to the first and second sample and hold circuits and configured to output the constant voltage outputted from the C-V converter in the second operating mode. The second differential amplifier is configured to obtain a difference voltage between the converted voltage held by the first sample and hold circuit and the constant voltage held by the second sample and hold circuit in the first operating mode.

The capacitive physical quantity sensor includes an amplifier connected to the first differential amplifier and configured to amplify the difference voltage to output an amplified first voltage, the amplifier being configured to amplify the constant voltage to output an amplified second voltage. The capacitive physical quantity sensor includes a third sample and hold circuit connected to the amplifier and configured to sample and hold the first voltage outputted from the amplifier. The capacitive physical quantity sensor includes a fourth sample and hold circuit connected to the amplifier and configured to sample and hold the second voltage outputted from the amplifier.

The capacitive physical quantity sensor includes a second differential amplifier connected to the third and fourth sample and hold circuits and configured to obtain a difference between the first voltage held by the third sample and hold circuit and the second voltage held by the fourth sample and hold circuit.

According to a further aspect of the present invention, there is provided a capacitive physical quantity sensor, which includes a first sensor element having a first movable electrode and a first fixed electrode opposite to the first movable electrode. The first movable electrode is displacable depending on change of a first physical quantity. The capacitive physical quantity sensor includes a second sensor element having a second movable electrode and a second fixed electrode opposite to the second movable electrode. The second movable electrode is displacable depending on change of a second physical quantity. The capacitive physical quantity sensor includes a C-V converter configured to convert a variation in one of a capacitance between the first movable electrode and the first fixed electrode of the first sensor element and that between the second movable electrode and the second fixed electrode of the second sensor element into a voltage to output the converted voltage in a first operating mode. The C-V converter is configured to output a constant voltage in a second operating mode.

The capacitive physical quantity sensor includes a first sample and hold circuit connected to the C-V converter and configured to operate in the first operating mode to sample and hold the converted voltage outputted from the C-V converter based on the capacitance of the first sensor element. The capacitive physical quantity sensor includes a second sample and hold circuit connected to the C-V converter and configured to operate in the first operating mode to sample and hold the converted voltage outputted from the C-V converter based on the capacitance of the second sensor element. The capacitive physical quantity sensor includes a third sample and hold circuit connected to the C-V converter and configured to operate in the second operating mode to sample and hold the constant voltage outputted from the C-V converter.

The capacitive physical quantity sensor includes a first differential amplifier connected to the first and third sample and hold circuits and configured to obtain a first difference voltage between the converted voltage held by the first sample and hold circuit and the constant voltage held by the third sample and hold circuit in the first operating mode. The capacitive physical quantity sensor includes a second differential amplifier connected to the second and third sample and hold circuits and configured to obtain a second difference voltage between the converted voltage held by the second sample and hold circuit and the constant voltage held by the third sample and hold circuit in the first operating mode. One of the first and second differential amplifiers is configured to output the constant voltage outputted from the C-V converter in the second operating mode.

The capacitive physical quantity sensor includes a first amplifier connected to the first differential amplifier and configured to amplify the first difference voltage to output an amplified first voltage. The capacitive physical quantity sensor includes a second amplifier connected to the second differential amplifier and configured to amplify the second difference voltage to output an amplified second voltage. One of the first and second amplifiers is configured to amplify the constant voltage to output an amplified third voltage. The capacitive physical quantity sensor includes a fourth sample and hold circuit connected to the first amplifier and configured to sample and hold the first voltage outputted from the first amplifier, and a fifth sample and hold circuit connected to the second amplifier and configured to sample and hold the second voltage outputted from the second amplifier. The capacitive physical quantity sensor includes a sixth sample and hold circuit connected to at least corresponding one of the first amplifier and the second amplifier and configured to sample and hold the third voltage outputted from one of the first and second amplifiers.

The capacitive physical quantity sensor includes a third differential amplifier connected to the fourth and sixth sample and hold circuits and configured to obtain a difference between the first voltage held by the fourth sample and hold circuit and the third voltage held by the sixth sample and hold circuit. The capacitive physical quantity sensor includes a fourth differential amplifier connected to the fifth and sixth sample and hold circuits and configured to obtain a difference between the second voltage held by the fifth sample and hold circuit and the third voltage held by the sixth sample and hold circuit.

According to a still further aspect of the present invention, there is provided a capacitive physical quantity sensor including a first sensor element having a first movable electrode and a first fixed electrode opposite to the first movable electrode. The first movable electrode is displacable depending on change of a first physical quantity. The capacitive physical quantity sensor includes a second sensor element having a second movable electrode and a second fixed electrode opposite to the second movable electrode. The second movable electrode is displacable depending on change of a second physical quantity. The capacitive physical quantity sensor includes a C-V converter configured to convert a variation in one of a capacitance between the first movable electrode and the first fixed electrode of the first sensor element and that between the second movable electrode and the second fixed electrode of the second sensor element into a voltage to output the converted voltage in a first operating mode. The C-V converter is configured to output a constant voltage in a second operating mode.

The capacitive physical quantity sensor includes a first sample and hold circuit connected to the C-V converter and configured to operate in the first operating mode to sample and hold the converted voltage outputted from the C-V converter based on the capacitance of one of the first sensor element and the second sensor element. The capacitive physical quantity sensor includes a second sample and hold circuit connected to the C-V converter and configured to operate in the second operating mode to sample and hold the constant voltage outputted from the C-V converter.

The capacitive physical quantity sensor includes a first differential amplifier connected to the first and second sample and hold circuits and configured to obtain a difference voltage between the converted voltage held by the first sample and hold circuit and the constant voltage held by the second sample and hold circuit in the first operating mode. The first differential amplifier is configured to output the constant voltage outputted from the C-V converter in the second operating mode. The capacitive physical quantity sensor includes an amplifier connected to the first differential amplifier and configured to amplify the first difference voltage to output an amplified first voltage. The amplifier is configured to amplify the constant voltage to output an amplified second voltage.

The capacitive physical quantity sensor includes a fourth sample and hold circuit connected to the amplifier and configured to sample and hold the first voltage outputted from the amplifier based on the capacitance of the first sensor element, and a fifth sample and hold circuit connected to the amplifier and configured to sample and hold the first voltage outputted from the amplifier based on the second sensor element. The capacitive physical quantity sensor includes a sixth sample and hold circuit connected to the amplifier and configured to sample and hold the second voltage outputted from the amplifier.

The capacitive physical quantity sensor includes a second differential amplifier connected to the fourth and sixth sample and hold circuits and configured to obtain a difference between the first voltage held by the fourth sample and hold circuit and the second voltage held by the sixth sample and hold circuit. The capacitive physical quantity sensor includes a third differential amplifier connected to the fifth and sixth sample and hold circuits and configured to obtain a difference between the first voltage held by the fifth sample and hold circuit and the second voltage held by the sixth sample and hold circuit.

According to a still further aspect of the present invention, there is provided a capacitive physical quantity sensor including a capacitive physical quantity sensor including a first sensor element having a first movable electrode and a first fixed electrode opposite to the first movable electrode. The first movable electrode is displacable depending on change of a first physical quantity. The capacitive physical quantity sensor includes a second sensor element having a second movable electrode and a second fixed electrode opposite to the second movable electrode. The second movable electrode is displacable depending on change of a second physical quantity. The capacitive physical quantity sensor includes a C-V converter configured to convert a variation in one of a capacitance between the first movable electrode and the first fixed electrode of the first sensor element and that between the second movable electrode and the second fixed electrode of the second sensor element into a voltage to output the converted voltage in a first operating mode. The C-V converter is configured to output a constant voltage in a second operating mode.

The capacitive physical quantity sensor includes a first sample and hold circuit connected to the C-V converter and configured to operate in the first operating mode to sample and hold the converted voltage outputted from the C-V converter based on the capacitance of one of the first sensor element and the second sensor element, and a second sample and hold circuit connected to the C-V converter and configured to operate in the second operating mode to sample and hold the constant voltage outputted from the C-V converter. The capacitive physical quantity sensor includes a first differential amplifier connected to the first and second sample and hold circuits and configured to obtain a difference voltage between the converted voltage held by the first sample and hold circuit and the constant voltage held by the second sample and hold circuit in the first operating mode. The first differential amplifier is configured to output the constant voltage outputted from the C-V converter in the second operating mode. The capacitive physical quantity sensor includes an amplifier connected to the first differential amplifier and configured to amplify the first difference voltage to output an amplified first voltage. The amplifier is configured to amplify the constant voltage to output an amplified second voltage. The capacitive physical quantity sensor includes a fourth sample and hold circuit connected to the amplifier and configured to sample and hold the first voltage outputted from the amplifier, and a fifth sample and hold circuit connected to the amplifier and configured to sample and hold the second voltage outputted from the amplifier. The capacitive physical quantity sensor includes a second differential amplifier connected to the fourth and fifth sample and hold circuits and configured to obtain a difference between the first voltage held by the fourth sample and hold circuit and the second voltage held by the fifth sample and hold circuit.

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS OF THE INVENTION

Embodiments of the present invention will be described hereinafter with reference to the accompanying drawings.

First Embodiment

Figure 1:
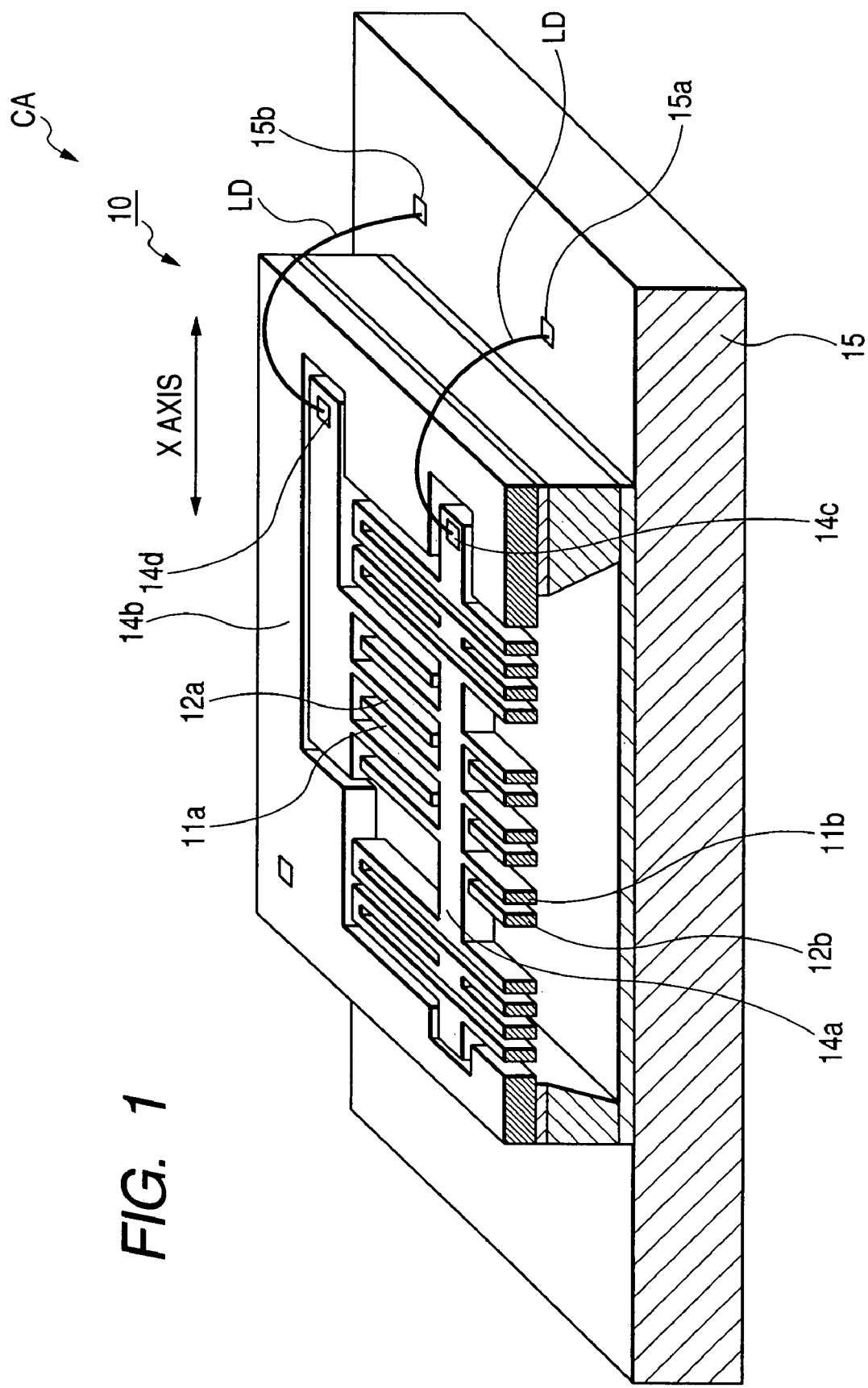
FIG. 1 is a partially cross sectional perspective view of a capacitive acceleration sensor according to a first embodiment of the present invention.
Figure 2:
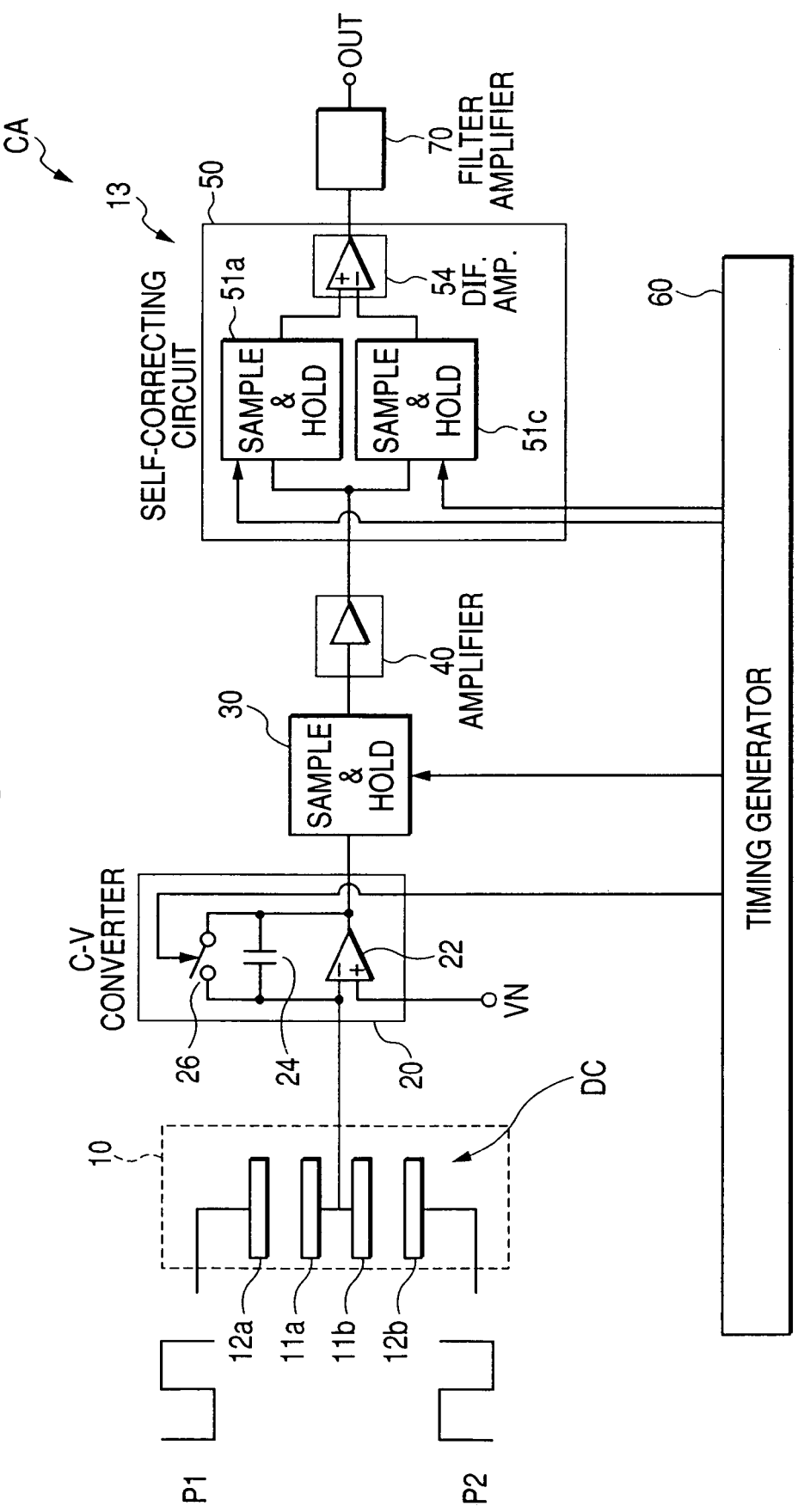
FIG. 2 is a circuit diagram of the capacitive acceleration sensor shown in FIG. 1.

FIG. 1 illustrates an example of the structure of a capacitive acceleration sensor according to a first embodiment of the present invention; FIG. 2 illustrates an example of the circuit structure of the capacitive acceleration sensor illustrated in FIG. 1.

As illustrated in FIGS. 1 and 2, the capacitive acceleration sensor CA is operative to detect acceleration along an X axis (see FIG. 1); this acceleration is an example of physical quantities. The capacitive acceleration sensor CA is, for example, installed in a vehicle such that the X axis corresponds to, for example, the front/rear direction of the vehicle or the left/right direction thereof.

The capacitive acceleration sensor CA is provided with a sensor element 10 and an acceleration detection circuit 13 (see FIG. 2). The sensor element 10 is designed to a beam assembly 14 formed by a semiconductor chip. The beam assembly 14 is composed of a mass portion 14a, a plurality of movable electrodes 11a and 11b, a bar portion 14b, and a plurality of fixed electrodes 12a and 12b. The acceleration detection circuit 13 is formed on an electrical circuit chip 15 on which the semiconductor chip including the beam assembly 14 is mounted. The sensor element 10 and the electrical circuit chip 15 are accommodated in a package (not shown).

The mass portion 14a has a substantially bar shape disposed along the X direction to be displacable therealong. The movable electrodes 11a and 11b are oppositely disposed to extend from both sides of the mass portion 14a in orthogonal to the longitudinal direction (X direction) thereof, respectively. The movable electrodes 11a and 11b are displacable along the X direction with the movement of the mass portion 14a.

The bar portion 14b is fixedly disposed in parallel to the mass portion 14a. The fixed electrodes 12a are fixedly disposed to extend from one side, which is opposite to the mass portion 14a, of the bar portion 14b in orthogonal to the longitudinal direction (X direction) thereof. The fixed electrodes 12a are arranged to be opposite to the movable electrodes 11a at predetermined thin gaps along the X direction, respectively. Similarly, the fixed electrodes 12b are arranged to be opposite to the movable electrodes 11b at predetermined thin gaps along the X direction, respectively.

The mass portion 14a is formed at its one end with a conductive pad 14c, and the bar portion 14b is formed at its one end with a conductive pad 14d. The electrical circuit chip 15 is provided with electrical pads 15a and 15b electrically connected to the acceleration detection circuit 13. For example, the conductive pads 14c and 14d are electrically connected to the conductive pads 15a and 15b through lead wires LD, respectively, which establishes electric connection between the movable electrodes 11a, 11b and the acceleration detection circuit 13, and between the fixed electrodes 12a and the acceleration detection circuit 13. Similarly, the fixed electrodes 12b are electrically connected to the acceleration detection circuit 13.

Each pair of the movable electrodes 11a and 11b oppositely disposed at both sides of the mass portion 14a and each pair of the fixed electrodes 12a and 12b opposite to each pair of the movable electrodes 11a and 11b provide a differential capacitor DC formed by a pair of capacitors (see FIG. 2).

For example, in each differential capacitor DC, each movable electrode is located at its neutral position equidistant from the corresponding fixed electrodes 12a and 12b. In each differential capacitor DC, the capacitances of the paired capacitors vary depending on an acceleration change of the vehicle applied to the mass portion 14a.

The acceleration detection circuit 13 is configured to substantially periodically apply alternately a first carrier signal (voltage signal) P1 to the fixed electrode 12a of each differential capacitor DC and a second carrier signal (voltage signal) P2 to the fixed electrode 12b thereof. The first and second carrier signals P1 and P2 are opposite in polarity.

The first and second carrier signals P1 and P2 applied to the fixed electrodes 12a and 12b of each differential capacitor DC allow detection of an acceleration applied to the mass portion 14a based on variations of the capacitances of the paired capacitors of each differential capacitor DC depending on the movement of the movable electrodes 11a and 11b.

As shown in FIG. 2, the acceleration detection circuit 13 includes a C-V (Capacitance-to-Voltage) converter 20, a sample and hold circuit 30, an amplifier 40, a self-correcting circuit 50, a timing generator 60, and a filter amplifier (low pass filter) 70.

The C-V converter 20 is operatively configured to convert changes of the capacitances of the paired capacitors of each differential capacitor DC into a corresponding voltage signal.

Specifically, the C-V converter 20 is provided with a first differential amplifier 22, a capacitor 24, and a switch 26. The inverting input terminal (−) of the first differential amplifier 22 is connected to the movable electrodes 11a and 11b of each differential capacitor DC. The capacitor 24 is connected between the inverting input terminal of the first differential amplifier 22 and the output terminal thereof. The switch 26 is also connected between the inverting input terminal of the first differential amplifier 22 and the output terminal thereof in parallel to the capacitor 24.

The C-V converter 20 is configured such that a predetermined constant voltage VN, which is the half of the amplitude (voltage level) V of each of the first and second carrier signals P1 and P2, is applied to the noninverting input terminal (+) of the first differential amplifier 22. The output terminal of the first differential amplifier 22 is connected to the sample and hold circuit 30.

The sample and hold circuit 30 is operatively configured to sample the value of the voltage signal converted by the C-V converter 20 at predetermined intervals of time and to hold each sampled value, thereby outputting the sampled values as a discrete voltage signal.

The amplifier 40 is connected to the sample and hold circuit 30 and operatively configured to amplify the discrete voltage signal output from the sample and hold circuit 30 at a predetermined gain and to output the amplified voltage signal to the self-correcting circuit 50.

The self-correcting circuit 50 is connected to the amplifier 40. The self-correcting circuit 50 is operatively configured to receive the amplified voltage signal output from the amplifier 40 and to correct the received voltage signal so as to eliminate an influence due to a change of operating characteristic of the amplifier 40 from the received voltage signal.

The filter amplifier 70 is connected to the self-correcting circuit 50. The filter amplifier 70 is operatively configured to permit predetermined components of the voltage signal output from the self-correcting circuit 50 to pass therethrough; these predetermined components are within a predetermined frequency band. The filter amplifier 70 is also operatively configured to output, through its output terminal "OUT", the predetermined components of the voltage signal as an acceleration detection signal.

The self-correcting circuit 50 includes a first sample and hold circuit 51a, a second sample and hold circuit 51c, and a second differential amplifier 54. The output terminal of the amplifier 40 is connected to both the first and second sample and hold circuits 51a and 51c. The output terminal of the first sample and hold circuit 51a is connected to the noninverting input terminal (+) of the second differential amplifier 54. The output terminal of the second sample and hold circuit 51c is also connected to the inverting input terminal (−) of the second differential amplifier 54. The output terminal of the differential amplifier 54 is connected to the filter amplifier 70.

The timing generator 60 is operatively configured to receive a reference clock signal CLK composed of a series of pulses. The timing generator 60 is also operatively configured to generate the first and second voltage signals P1 and P2 based on the clock signal CLK and to alternately apply the first voltage signal P1 to the fixed electrode 12a of each differential capacitor DC and the second voltage signal P2 to the fixed electrode 12b thereof. Each of the first and second carrier signals P1 and P2 has, for example, a rectangular waveform.

Furthermore, the timing generator 60 is connected to the switch 26, the sample and hold circuit 30, and the first and second sample and hold circuits 51a and 51c.

Specifically, the timing generator 60 is operatively configured to generate operating timing signals (pulse signals) S1, S2, S3, and 84 based on the clock signal CLK. The operating timing signal S1 allows the switch 26 to open or close. Specifically, the switch 26 is designed to a semiconductor switch so that the operating timing signal S1 (see FIG. 3) with a predetermined first voltage level (high level) permits the switch 26 to close. In contrast, the operating timing signal S1 with a predetermined second voltage level (low level) lower than the first voltage level permits the switch 26 to open.

Operations of the capacitive acceleration detection CA will be described hereinafter with reference to a time chart of the signals P1, P2, and S1 to S4 illustrated in FIG. 3.

The first and second carrier signals P1 and P2 outputted from the timing generator 60 are pulse signals with rectangular waveforms. The first and second carrier signals P1 and P2 have the predetermined amplitude (voltage level) V. Each of the first and second carrier signals P1 and P2 alternates between a high level state and a low level state based on the clock signal CLK. The second carrier signal P2 is an inversion of the first carrier signal P1 in voltage level.

In the first embodiment, first and second periods φ1 and φ2 are allocated to detect variations of the capacitances of the paired capacitors of each differential capacitor DC. A third period φC allows the second sample and hold circuit 51c to hold correction values for the operating characteristics of the amplifier 40.

Similarly, each of the operating timing signals S2 to S4 alternates between a high level state and a low level state at the first, second, and third periods (φ1, φ2, and φC) of the clock signal CLK. The polarity of the operating timing signal S2 is inversed to that of the first carrier signal P1. Specifically, the high level of the operating timing signal S2 during each of the second and third periods φ2 and φC of the clock signal CLK allows the sample and hold circuit 30 to operate. Moreover, the operating timing signal S3 is in its high level during each of the first and second periods φ1 and φ2 of the clock signal CLK. The high level of the operating timing signal S3 allows the first sample and hold circuit 51a to operate, Similarly, the operating timing signal S4 whose waveform is inverted with respect to that of the operating timing signal S3 such that the operating timing signal S4 is in its high level during the third period φ3 of the clock signal CLK. The high level of the operating timing signal S4 allows the second sample and hold circuit 51c to operate.

Operations of the capacitive acceleration sensor CA can be changed between a normal mode during each of the first and second periods φ1 and φ2 and a correction value holding mode during each third period φC.

First, operations of the sensor CA in the correction value holding mode for causing the second sample and hold circuit 51c to hold the correction values for the operating characteristics of the amplifier 40 during each third period φC will be described hereinafter.

During each third period φC, both the first carrier signal P1 and the second carrier signal P2 are in their low level states. During each third period φC, the timing signal S1 with its high level allows the switch 26 to be kept closed, and the timing signal S4 with its high level permits the second sample and hold circuit 51c to operate. The closed state of the switch 26 permits the inverting terminal of the first differential amplifier 22 to short-circuit to the output terminal thereof, which results in that the first differential amplifier 22 operates as a voltage follower (impedance converter). This causes the voltage VN (V/2) applied to the noninverting terminal of the amplifier 22 to be output from the amplifier 22 through the output terminal thereof.

The timing signal S2 sent from the timing generator 60 with its high level during each period φC permits the sample and hold circuit 30 to sample and hold the voltage VN (V/2) outputted from the amplifier 22. Thereafter, the voltage VN (V/2) is amplified by the amplifier 40 so that a voltage "V/2+Vg" is outputted from the amplifier 40; this "Vg" represents voltage increases based on the amplification of the amplifier 40. The timing signal S4 with its high level during each period φC permits the output voltage "V/2+Vg" from the amplifier 40 to input to the second sample and hold circuit 51c to be held therein as the correction value.

Next, operations of the sensor CA in the normal mode during each of the first and second periods φ1 and φ2 will be described hereinafter.

During each first period φ1, the first carrier signal P1 is in its high level state, but the second carrier signal P2 is in its low level state. During each first period φ1, the timing signal S1 with its high level allows the switch 26 to be kept closed. In the state of the sensor CA during each period φ1, the voltage VN (V/2) is applied to the noninverting terminal of the amplifier 22 to be outputted through the output terminal thereof. The closed state of the switch 26 permits the output voltage V/2 from the amplifier 22 to be fed back to the inverting input terminal thereof and to be applied to the movable electrodes 11a and 11b of each differential capacitor DC. The voltage of the movable electrodes 11a and 11b of each differential capacitor DC is clamped to the voltage V/2.

In addition, the first carrier signal P1 with the voltage level of V applied to the fixed electrode 12a of each differential capacitor DC causes a voltage "V/2" to be applied to the movable electrodes 11a and 11b. Because the switch 26 is kept closed, charges charged in the capacitor 24 are discharged.

During each first period φ1, charges are stored between the movable electrode 11a and the fixed electrode 12a of each differential capacitor DC. The stored charge amount Q1 is expressed as "Q1=−C1·V/2", where C1 represents a resultant capacitance between the movable electrode 11a and the fixed electrode 12a of each differential capacitor DC. Note that the negative sign attached to the expression of the stored charge amount Q1 means that negative charges are stored at surfaces of the movable electrodes 11a and 11b of each differential capacitor DC, these surfaces are opposite to the fixed electrode 12a of each differential capacitor DC.

In addition, during each first period φ1, charges are stored between the movable electrode 11b and the fixed electrode 12b of each differential capacitor DC. The stored charge amount Q2 is expressed as "Q2=C2·V/2", where C2 represents a resultant capacitance between the movable electrode 11b and the fixed electrode 12b of each differential capacitor DC. For example, the capacitances C1 and C2 are differential with respect to each other.

After each first period φ1, during each second period φ2, the first carrier signal P1 is in its low level state, but the second carrier signal P2 is in its high level state. During each second period φ2, the timing signal S1 with its low level allows the switch 26 to be kept opened, and the timing signal S2 with its high level is applied to the sample and hold circuit 30.

In the state of the sensor CA during each period φ2, the second carrier signal P2 with the voltage level of V applied to the fixed electrode 12b of each differential capacitor DC causes a voltage "V/2" to be applied to the movable electrodes 11a and 11b. Because the switch 26 remains opened, the capacitor 24 is charged.

During each second period φ2, charges are stored between the movable electrode 11a and the fixed electrode 12a of each differential capacitor DC. The stored charge amount Q1a is expressed as "Q1a=C1·V/2". In addition, during each second period φ2, charges are stored between the movable electrode 11b and the fixed electrode 12b of each differential capacitor DC. The stored charge amount Q2a is expressed as "Q2a=−C2·V/2".

The total amount of charges accumulated in the movable electrodes 11a and 11b of each differential capacitor DC during each first period φ1 is given by "Q1+Q2". The total amount of charges accumulated in the movable electrodes 11a and 11b of each differential capacitor DC during each second period φ2 is given by "Q1a+Q2a". The difference ΔQ between the total change amounts is expressed as the following equation:

ΔQ=(Q1+Q2)−(Q1a+Q2a)=−(C1−C2)V

For example, when the movable electrodes 11a and 11b are kept to their neutral positions, because the differential capacitance C1 between the movable electrode 11a and the fixed electrode 12a of each differential capacitor DC is equal to the differential capacitance C2 between the movable electrode 11b and the fixed electrode 12b thereof.

In contrast, when the differential capacitance C1 is different from the differential capacitance C2 based on an acceleration applied to the sensor element 10, charges whose amount is represented as ΔQ may occur in the movable electrodes 11a and 11b of each differential capacitor DC at the end of each period φ2. Because the operation of the first differential amplifier 22 allows the potentials of the movable electrodes 11a and 11b to be kept to V/2, the charges ΔQ are accumulated in one electrode of the capacitor 24, which leads to the movable electrodes 11a and 11b, so that charges of the opposite polarity with respect to the charges ΔQ, whose amount is represented as "ΔQa", are accumulated in the other electrode of the capacitor 24. The ΔQa is expressed as "ΔQa=(C1−C2)V".

As a result, the voltage "ΔQa/Cf+V/2", which is expressed by the following equation, occurs at the output terminal of the first differential amplifier 22:

ΔQa/Cf+V/2=(C1−C2)V/Cf+V/2 where Cf represents the capacitance of the capacitor 24.

That is, the voltage depending on the capacitance difference "C1−C2" appears at the output terminal of the first differential amplifier 22. As described above, because the capacitance difference "C1−C2" depends on the applied acceleration to the sensor element 10, the voltage represents the applied actual acceleration.

Specifically, in the normal mode, the voltage "(C1−C2)V/Cf+V2" is sampled by the sample and hold circuit 30 during each second period φ2, and the sampled voltage is held by the sample and hold circuit 30 during each first period φ1. The sampled voltage "(C1−C2)V/Cf+V2" held by the sample and hold circuit 30 is amplified by the amplifier 40 so that a voltage "(C1−C2)V/Cf+V2+Vg" is outputted therefrom.

Because the timing signal S3 with its high level is applied to the first sample and hold circuit 51a during each of the fist and second periods φ1 and φ2, the amplified voltage "(C1−C2)V/Cf+V2+Vg" is sampled to be held by the first sample and hold circuit 51a.

Therefore, the different voltage VD between the voltage "(C1−C2)V/Cf+V2+Vg" held by the first sample and hold circuit 51a and the correction value (voltage) "V/2+Vg" held by the second sample and hold circuit 51c are obtained by the second differential amplifier 54. The different voltage VD is represented by the following equation:

$$VD = \{(C1 - C2)V/Cf + V2 + Vg\} - \{V/2 + Vg\} \qquad \text{[Equation 1]}$$
$$= (C1 - C2)V/Cf$$

The different voltage VD outputted from the second differential amplifier 54 is inputted to the filter amplifier 70. Predetermined components of the different voltage VD, which are within the predetermined frequency band, are allowed to pass through the filter amplifier 70. The predetermined components of the different voltage VD are outputted from the output terminal OUT as an acceleration detection signal.

As described above, in the capacitive acceleration sensor CA according to the first embodiment, in the correction value holding mode, the closed state of the switch 26 allows the inverting input terminal and the output terminal of the first differential amplifier 22 to short-circuit each other. This causes the first differential amplifier 22 to output the constant voltage VN (=V/2) to the amplifier 40. The output voltage from the amplifier 40 is sampled to be held by the second sample and hold circuit 51c as the correction value. The correction value held by the second sample and hold circuit 51c is expressed by "V/2+Vg", this "Vg" represents voltage increases based on the amplification of the amplifier 40.

On the other hand, in the normal mode, while the switch 26 is kept opened, the voltage "ΔQa/Cf+V/2=(C1−C2)V/Cf+V/2" depending on the capacitance difference "C1−C2" is outputted from the first differential amplifier 22. The output voltage "(C1−C2)V/Cf+V/2" is sampled to be held by the sample and hold circuit 30, and the voltage "(C1−C2)V/Cf+V/2" is amplified by the amplifier 40 so that the voltage "(C1−C2)V/Cf+V/2+Vg" is outputted therefrom. The output voltage "(C1−C2)V/Cf+V/2+Vg" is input to the second sample and hold circuit 51c to be held thereby.

In the first embodiment, therefore, it is possible for the second differential amplifier 54 to calculate the different voltage VD between the voltage "(C1−C2)V/Cf+V/2+Vg" held by the first sample and hold circuit 51a and the correction value (voltage) "V/2+Vg" held by the second sample and hold circuit 51c. This makes it possible to cancel the voltage Vg corresponding to the voltage increases based on the amplification of the amplifier 40 from the voltage "(C1–C2)V/Cf+V/2+Vg".

The predetermined components of the different voltage VD are outputted from the output terminal OUT as the acceleration detection signal.

As clearly represented by the equation 1, canceling the components depending on the gain of the amplifier 40 from the voltage "(C1–C2)V/Cf+V/2+Vg" allows the different voltage VD to depend on only the capacitances C1, C2, and Cf, and the voltage level V of each carrier signal. In other words, canceling the components depending on the gain of the amplifier 40 from the voltage "(C1–C2)V/Cf+V/2+Vg" permits the different voltage VD to be obtained independently of the voltage Vg corresponding to the voltage increases based on the amplification of the amplifier 40.

That is, even if the operating characteristics of the amplifier 40 including the gain thereof deteriorate over time, the differential voltage VD is obtained independently of the operating characteristics of the amplifier 40, which allows the capacitive acceleration sensor CA to operate with little influence from age deterioration of the operating characteristics of the amplifier 40.

In addition, for the reasons mentioned above, even if the operating characteristics of the amplifier 40 including the gain thereof vary depending on change in ambient temperature, it is possible to make the capacitive acceleration sensor operate with little influence from the variation of operating characteristics of the amplifier 40 depending on change in ambient temperature.

Moreover, in the first embodiment, arrangement of the filter amplifier 70 to the output side of the second differential amplifier 54 can prevent the filter amplifier 70 with a predetermined time constant from affecting the canceling operations of the second differential amplifier 54.

Figure 3:
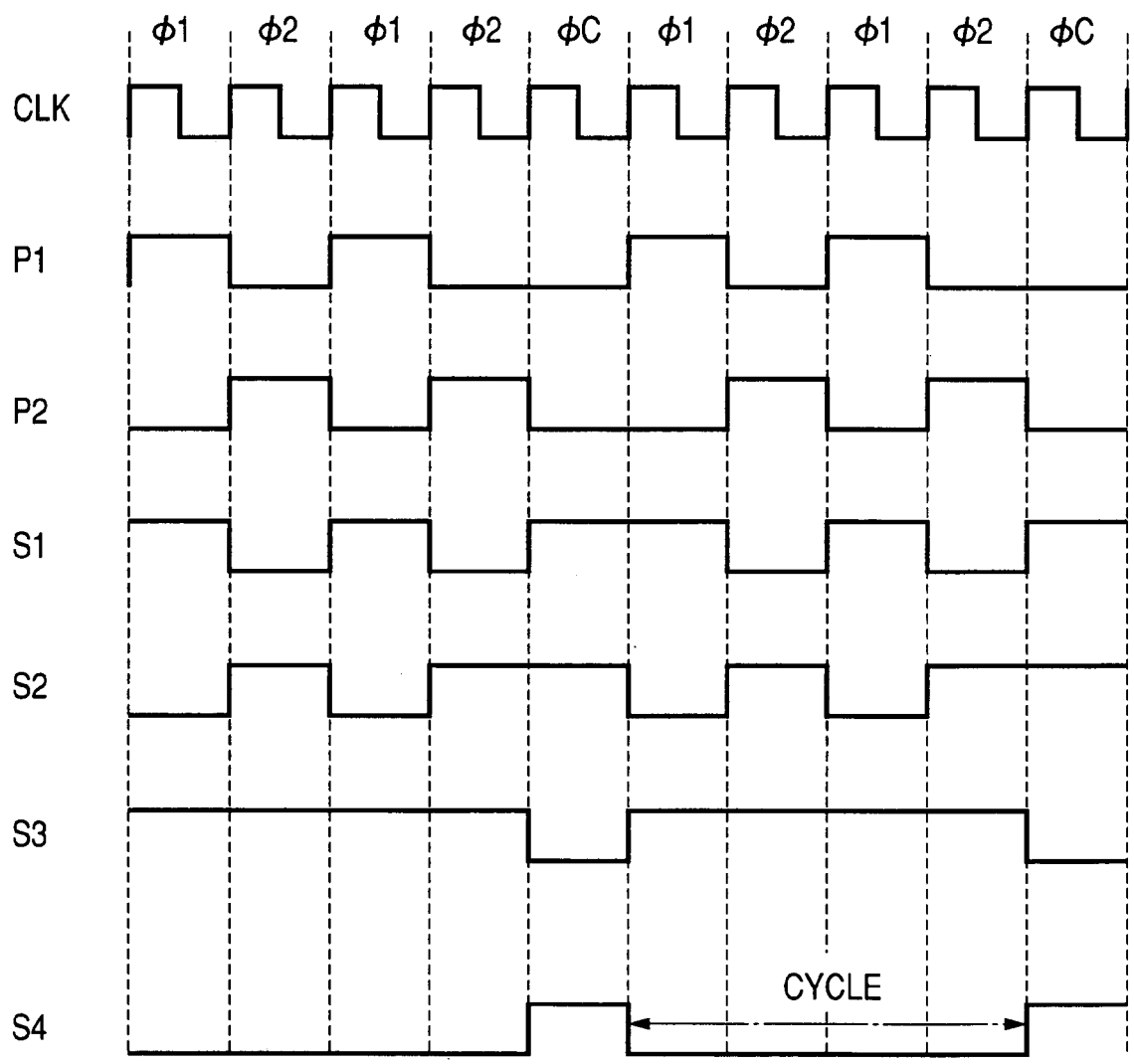
FIG. 3 is a time chart of carrier signals and operating timing signals generated by a timing generator illustrated in FIG. 2.

In the first embodiment, as illustrated in FIG. 3, the cycle of the third period φC during which the closed state of the switch 26 allows the second sample and hold circuit 51c to hold the correction value for the amplifier 40 is set to the square of the sum of the first period φ1 and the second period φ2. This makes it possible to easily control the switch 26 and the second sample and hold circuit 51c.

The cycle of the third period φC during which the closed state of the switch 26 allows the second sample and hold circuit 51c to hold the correction value for the amplifier 40 can be set to the n-th power of the sum of the first period φ1 and the second period φ2, where n is an integer equal to or more than 3.

Second Embodiment

Figure 4:
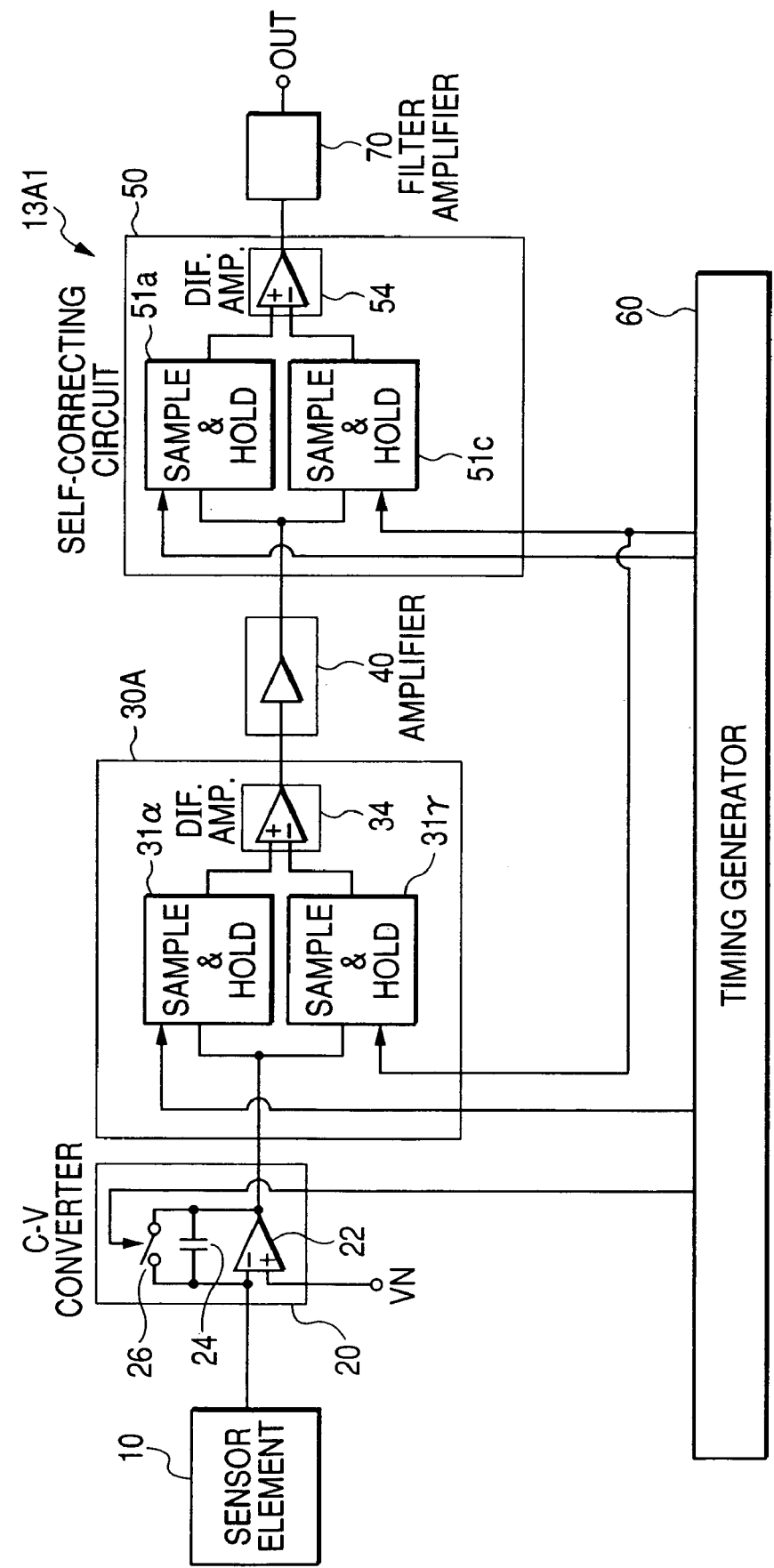
FIG. 4 is a circuit diagram of a capacitive acceleration sensor according to a second embodiment of the invention.

FIG. 4 illustrates an example of the circuit structure of a capacitive acceleration sensor CA1 according to a second embodiment of the present invention. Note that elements of the capacitive acceleration sensor CA1 according to the second embodiment, which are substantially identical to those of the capacitive acceleration sensor CA according to the first embodiment shown in FIGS. 1 and 2, are represented by the same reference characters as in FIGS. 1 and 2. The descriptions of the elements of the capacitive semiconductor sensor CA1 according to the second embodiment are therefore omitted or simplified.

As illustrated in FIG. 4, an acceleration detection circuit 13A1 according to the second embodiment is provided with a sample and hold circuit 30A whose structure is different from that of the sample and hold circuit 30 shown in FIG. 2.

Specifically, the sample and hold circuit 30A includes a third sample and hold circuit 31α, a fourth sample and hold circuit 31γ, and a third differential amplifier 34. The output terminal of the first differential amplifier 22 is connected to both the third and fourth sample and hold circuits 31α and 31γ. The output terminal of the third sample and hold circuit 31α is connected to the noninverting input terminal (+) of the third differential amplifier 34. The output terminal of the fourth sample and hold circuit 31γ is connected to the inverting input terminal (−) of the third differential amplifier 34. The output terminal of the third differential amplifier 34 is connected to the amplifier 40.

The high level of the operating timing signal S2 during each second period φ2 of the clock signal CLK allows the third sample and hold circuit 31α to operate. The high level of the operating timing signal S4 allows each of the second sample and hold circuit 51c and the fourth sample and hold circuit 31γ to operate.

Operations of the capacitive acceleration sensor CA1 according to the second embodiment will be described hereinafter.

In the correction value holding mode, during each third period φC, the timing signal S4 with its high level permits the fourth sample and hold circuit 31α to sample and hold the voltage outputted from the amplifier 22 as a correction value for the operating characteristics of the C-V converter 20.

In the normal mode, during each second period φ2, the timing signal S2 with its high level permits the third sample and hold circuit 31α to sample and hold the voltage outputted from the amplifier 22.

Therefore, the third differential amplifier 34 is configured to obtain the difference between the voltage held by the third sample and hold circuit 31α and the correction value held by the fourth sample and hold circuit 31γ, thereby outputting the different voltage to the amplifier 40.

In the capacitive acceleration sensor CA1 according to the second embodiment, in the correction value holding mode, the closed state of the switch 26 allows the inverting input terminal and the output terminal of the first differential amplifier 22 to short-circuit each other. This causes the first differential amplifier 22 to output the constant voltage VN (=V/2) to the fourth sample and hold circuit 31γ to be sampled and held thereby. The held voltage by the fourth sample and hold circuit 31γ is amplified by the amplifier 40 so that the amplified voltage is sampled to be held by the second sample and hold circuit 51c as the correction value. The correction value held by the second sample and hold circuit 51c is expressed by "V/2+Vg"; this "Vg" represents voltage increases based on the amplification of the amplifier 40.

On the other hand, in the normal mode, while the switch 26 is kept opened, the voltage depending on the capacitance difference "C1–C2" is outputted from the first differential amplifier 22. The output voltage is sampled to be held by the third sample and hold circuit 31α.

In the second embodiment, it is possible for the third differential amplifier 34 to calculate the different voltage between the voltage held by the third sample and hold circuit 31α and the correction value (voltage) held by the fourth sample and hold circuit 31γ. The different voltage is amplified by the amplifier 40 so that the output voltage is sampled to be held by the first sample and hold circuit 51a. Like the first embodiment, the second differential amplifier 54 calculates the difference voltage between the voltage held by the first sample and hold circuit 51*a* and the correction voltage held by the second sample and hold circuit 51*c*.

As described above, in the second embodiment, it is possible for the third differential amplifier 34 to cancel components contained in the voltage outputted from the C-V converter 20 and affected by the operations thereof. In addition, as well as the first embodiment, in the second embodiment, it is possible for the second differential amplifier 54 to cancel the voltage Vg corresponding to the voltage increases based on the amplification of the amplifier 40 from the voltage depending on the capacitance difference "C1–C2".

Even if the operating characteristics of the C-V converter 20 and/or the amplifier 40 deteriorate over time, it is possible to make the capacitive acceleration sensor CA1 operate with little influence from age deterioration of the operating characteristics of the C-V converter 20 and/or the amplifier 40.

For the reasons mentioned above, even if the operating characteristics of the C-V converter 20 and/or the amplifier 40 vary depending on change in ambient temperature, the capacitive acceleration sensor CA1 can operate with little influence from the variation of operating characteristics of the C-V converter 20 and/or the amplifier 40 depending on change in ambient temperature.

Third Embodiment

Figure 5:
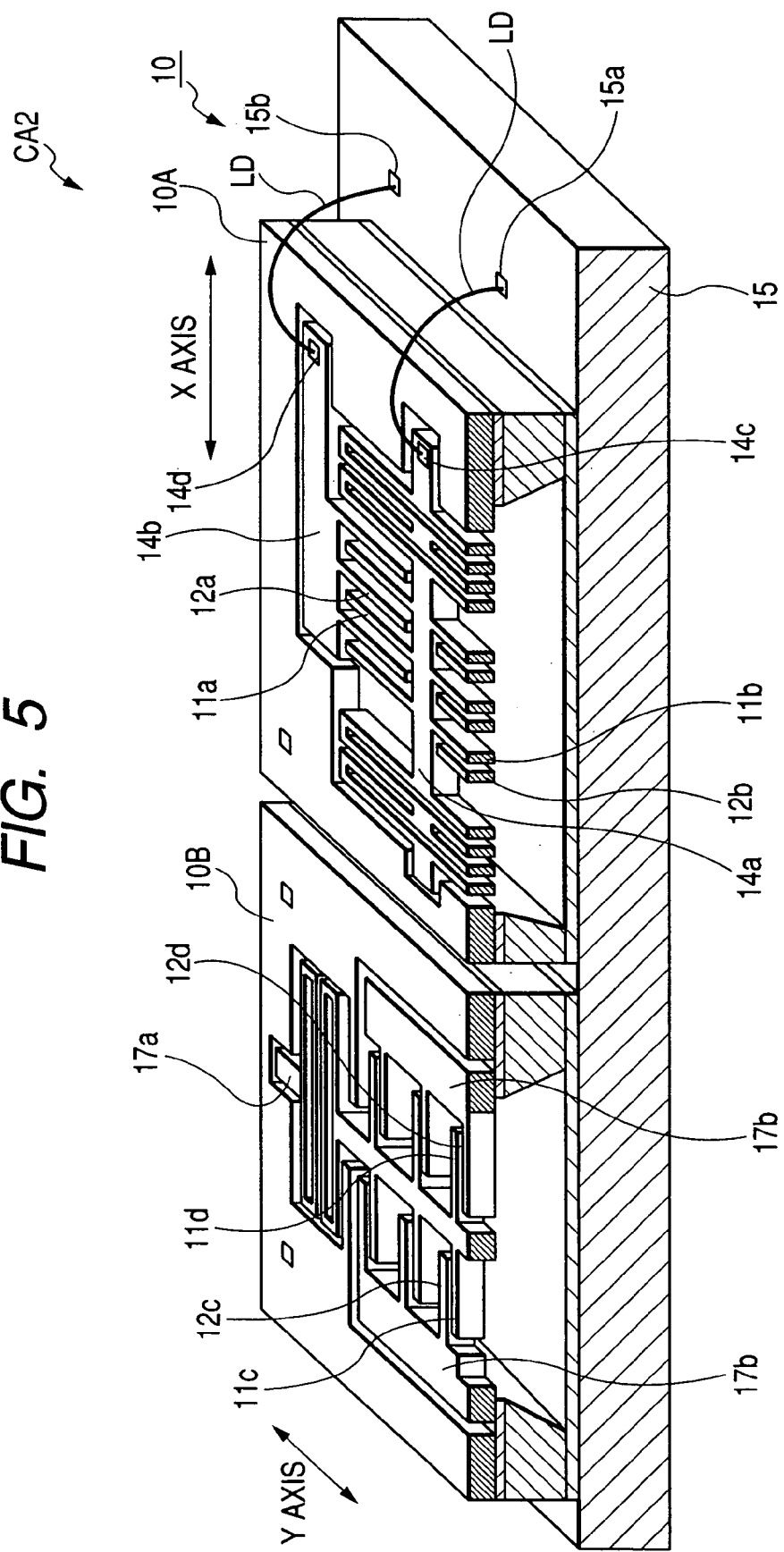
FIG. 5 is a partially cross sectional perspective view of a capacitive acceleration sensor according to a third embodiment of the present invention.
Figure 6:
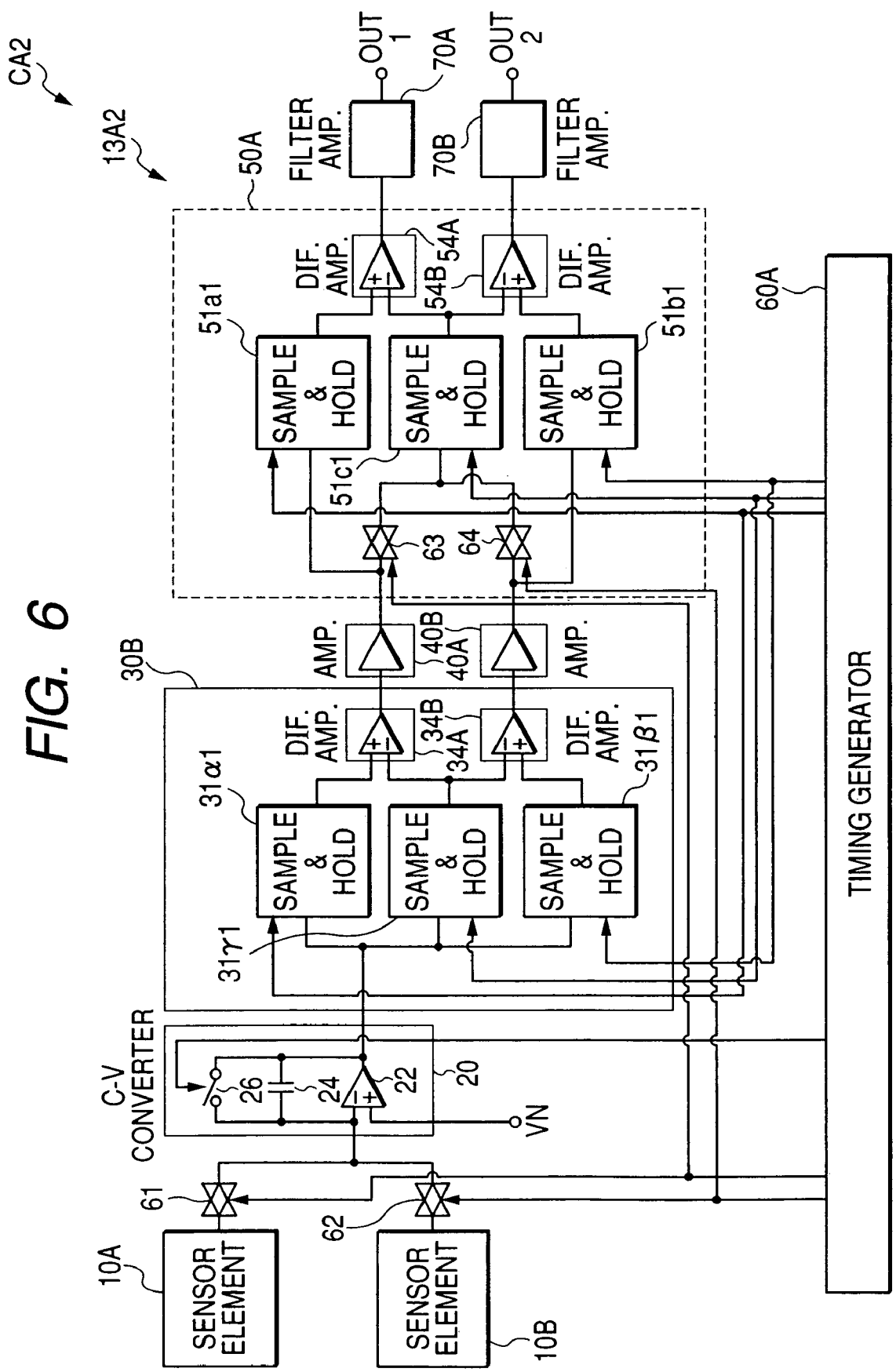
FIG. 6 is a circuit diagram of the capacitive acceleration sensor shown in FIG. 5.

FIG. 5 illustrates an example of the structure of a capacitive acceleration sensor CA2 according to a third embodiment of the present invention; FIG. 6 illustrates an example of the circuit structure of the capacitive acceleration sensor CA2 illustrated in FIG. 5. Note that elements of the capacitive acceleration sensor CA2 according to the third embodiment, which are substantially identical to those of the capacitive acceleration sensor CA according to the first embodiment shown in FIGS. 1 and 2, are represented by the same reference characters as in FIGS. 1 and 2. Therefore, the descriptions of the elements of the capacitive semiconductor sensor CA2 according to the third embodiment are omitted or simplified.

As illustrated in FIGS. 5 and 6, the capacitive acceleration sensor CA2 includes a first detection portion operative to detect acceleration along a first axis (X axis), and a second detection portion operative to detect acceleration along a second axis (Y axis) orthogonal to the X direction (see FIG. 5). In addition, the capacitive acceleration sensor CA2 is provided with a acceleration detection circuit 13A2.

The capacitive acceleration sensor CA2 is, for example, installed in a vehicle such that, for example, the X axis corresponds to the front/rear direction of the vehicle and the Y axis corresponds to the left/right direction thereof.

The first detection portion is provided with a first sensor element 10A whose structure is substantially the same as that of the sensor element 10.

The second detection portion is provided with a second sensor element 10B.

Like the sensor element 10 (first sensor element 10A), the second sensor element 10B is designed to a beam assembly 17 formed by a semiconductor chip, which is different from that of the first sensor element 10A. The beam assembly 17 is composed of a mass portion 17*a*, a plurality of movable electrodes 11*c* and 11*d*, a pair of bar portions 17*b*, 17*b*, and a plurality of filed electrodes 12*c* and 12*d*. The semiconductor chip including the beam assembly 17 is mounted on the electrical circuit chip 15. The first and second sensor elements 10A and 10B and the electrical circuit chip 15 are accommodated in a package (not shown).

The mass portion 17*a* has a substantially bar shape disposed along the Y direction to be movable therealong. The movable electrodes 11*c* and 11*d* are oppositely disposed to extend from both sides of the mass portion 17*a* in orthogonal to the longitudinal direction (Y direction) thereof, respectively. The movable electrodes 11*c* and 11*d* are movable along the Y direction with the movement of the mass portion 17*a*.

Each of the bar portions 17*b* is fixedly disposed in parallel to the mass portion 17*a*. The fixed electrodes 12*c* are fixedly disposed to extend from one side, which is opposite to the mass portion 17*a*, of one of the bar portions 17*b* in orthogonal to the longitudinal direction (Y direction) thereof. Similarly, the fixed electrodes 12*d* are fixedly disposed to extend from one side, which is opposite to the mass portion 17*a*, of the other of the bar portions 17*b* in orthogonal to the longitudinal direction (Y direction) thereof.

The fixed electrodes 12*c* are arranged to be opposite to the movable electrodes 11*c* at predetermined thin gaps along the Y direction, respectively. Similarly, the fixed electrodes 12*d* are arranged to be opposite to the movable electrodes 11*d* at predetermined thin gaps along the Y direction, respectively. The movable electrodes 11*c*, 11*d* and the acceleration detection circuit 13A2 are electrically connected to each other. The fixed electrodes 12*c* and 12*d* and the acceleration detection circuit 13A2 are also electrically connected to each other.

Each pair of the movable electrodes 11*c* and 11*d* oppositely disposed at both sides of the mass portion 17*a* and each pair of the fixed electrodes 12*c* and 12*d* opposite to each pair of the movable electrodes 11*c* and 11*d* provide a differential capacitor formed by a pair of capacitors.

For example, in each differential capacitor, each movable electrode is located at its neutral position equidistant from the corresponding fixed electrodes 12*c* and 12*d*. In each differential capacitor, the capacitances of the paired capacitors vary depending on an acceleration change of the vehicle applied to the mass portion 17*a*.

Like the first embodiment, the acceleration detection circuit 13A2 is configured to periodically apply alternately a third carrier signal (voltage signal) P3 to the fixed electrode 12*c* of each differential capacitor and a fourth carrier signal (voltage signal) P4 to the fixed electrode 12*d* thereof. The third and fourth carrier signals P3 and P4 are opposite in polarity. The third and fourth carrier signals P3 and P4 applied to the fixed electrode 12*c* and the fixed electrode 12*d* of each differential capacitor allow detection of an acceleration applied to the mass portion 17*a* based on variations of the capacitances of the paired capacitors of each differential capacitor depending on the movement of the movable electrodes 11*c* and 11*d*.

As shown in FIG. 6, the acceleration detection circuit 13*a*2 includes a first selector 61 electrically connected to the movable electrodes 11*a* and 11*b* of the first sensor element 10A and operatively configured to select the first sensor element 10A. The acceleration detection circuit 13*a*2 also includes a second selector 62 electrically connected to the movable electrodes 11*c* and 11*d* of the second sensor element 10B and operatively configured to select the second sensor element 10B.

In addition, the acceleration detection circuit 13*a*2 also includes a C-V converter 20 and a sample and hold circuit 30B. The output terminal of the first selector 61 is electrically connected to the inverting terminal of the first differential amplifier 22 of the C-V converter 20. Similarly, the output terminal of the second selector 62 is electrically connected to the inverting terminal of the first differential amplifier 22 of the C-V converter 20.

In addition, the acceleration detection circuit 13$a$2 includes a first amplifier 40A, a second amplifier 40B, a self-correcting circuit 50A, a timing generator 60A, and first and second filter amplifiers (low pass filters) 70A and 70B.

The sample and hold circuit 30B for sampling the voltage outputted from the C-V converter 20 and holding it for a predetermined period of time includes a fifth sample and hold circuit 31$\alpha$1 operative to sample and hold the voltage outputted from the first sensor element 10A through the C-V converter 20.

The sample and hold circuit 30B also includes a sixth sample and hold circuit 31$\gamma$1 operative to hold a correction value for the operating characteristics of the C-V converter 20, and a seventh sample and hold circuit 31$\beta$1 operative to sample and hold the voltage outputted from the second sensor element 10A through the C-V converter 20.

In addition, the sample and hold circuit 30B includes a fourth differential amplifier 34A and a fifth differential amplifier 34B. The output terminal of the first differential amplifier 22 is connected to both the fifth, sixth, and seventh sample and hold circuits 31$\alpha$1, 31$\gamma$1, and 31$\beta$1. The output terminal of the fifth sample and hold circuit 31$\alpha$1 is connected to the noninverting input terminal (+) of the fourth differential amplifier 34A.

The output terminal of the sixth sample and hold circuit 31$\gamma$1 is connected to the inverting input terminal (−) of each of the fourth and fifth differential amplifiers 34A and 34B. The output terminal of the seventh sample and hold circuit 31$\beta$1 is connected to the noninverting input terminal (+) of the fifth differential amplifier 34B. The output terminal of the fourth differential amplifier 34A is connected to the first amplifier 40A, and the output terminal of the fifth differential amplifier 34B is connected to the second amplifier 40B.

The first amplifier 40A is connected to the self-correcting circuit 50A and is operatively configured to amplify the voltage signal outputted from the fourth differential amplifier 34A at a predetermined gain. The second amplifier 40B is connected to the self-correcting circuit 50A and is operatively configured to amplify the voltage signal outputted from the fifth differential amplifier 34B at a predetermined gain.

The self-correcting circuit 50A is operatively configured to cancel components contained in the voltage outputted from each of the first and second amplifiers 40A and 40B; these components depend on the operating characteristics of each of the first and second amplifiers 40A and 40B.

Specifically, the self-correcting circuit 50A is provided with a third selector 63 electrically connected to the first amplifier 40A and operatively configured to select the output terminal of the first amplifier 40A corresponding to the first sensor element 10A. The self-correcting circuit 50B is also provided with a fourth selector 64 electrically connected to the output terminal of the second amplifier 40B and operatively configured to select the second amplifier 40B corresponding to the second sensor element 10B.

In addition, the self-correcting circuit 50$13$ is also provided with an eighth sample and hold circuit 51$a$1, a ninth sample and hold circuit 51$c$1, a tenth sample and hold circuit 51$b$1, a sixth differential amplifier 54A, and a seventh differential amplifier 54B.

The input terminal of the eighth sample and hold circuit 51$a$1 is electrically connected to the output terminal of the first amplifier 40A, and the output terminal of the eighth sample and hold circuit 51$a$1 is electrically connected to the noninverting terminal of the sixth differential amplifier 54A. The eighth sample and hold circuit 51$a$1 is operatively configured to sample and hold the voltage outputted from the first amplifier 40A corresponding to the first sensor element 10A.

The input terminal of the ninth sample and hold circuit 51$c$1 is electrically connected to both the output terminals of the first and second selectors 63 and 64, and the output terminal of the ninth sample and hold circuit 51$c$1 is electrically connected to both the inverting terminals of the sixth and seventh differential amplifiers 54A and 54B. The ninth sample and hold circuit 51$c$1 is operatively configured to hold correction values for the operating characteristics of the first amplifier 40A and for those of the second amplifier 40B.

The input terminal of the tenth sample and hold circuit 51$b$1 is electrically connected to the output terminal of the second amplifier 10B, and the output terminal of the tenth sample and hold circuit 51$b$1 is electrically connected to the noninverting terminal of the seventh differential amplifier 54B. The tenth sample and hold circuit 51$b$1 is operatively configured to sample and hold the voltage outputted from the second amplifier 40B corresponding to the second sensor element 10B.

The output terminal of each of the differential amplifiers 54A and 54B is electrically connected to the input terminal of each of the first and second filter amplifiers 70A and 70B. The filter amplifiers 70A and 70B have the output terminals OUT1 and OUT2, respectively.

The timing generator 60A is operatively configured to receive a reference clock signal CLK composed of a series of pulses. The timing generator 60A is also operatively configured to generate the first and second voltage signals P1 and P2 each having the amplitude of V based on the clock signal CLK, and the third and fourth voltage signals P3 and P4 each having the amplitude of V based on the clock signal CLK.

The timing generator 60A is operatively configured to alternately apply the first voltage signal P1 to the fixed electrode 12$a$ of each differential capacitor and the second voltage signal P2 to the fixed electrode 12$b$ thereof. Moreover, the timing generator 60A is operatively configured to alternately apply the third voltage signal P3 to the fixed electrode 12$c$ of each differential capacitor and the fourth voltage signal P4 to the fixed electrode 12$b$ thereof. Each of the first to fourth carrier signals P1 to P4 has, for example, a rectangular waveform.

In addition, the timing generator 60A is connected to the first and second selectors 61 and 62, the switch 26, the fifth, sixth, and seventh sample and hold circuits 31$\alpha$1, 31$\gamma$1, and 31$\beta$1, the third and fourth selectors 63 and 64, and the eighth, ninth, and tenth sample and hold circuits 51$a$1, 51$c$1, and 51$b$1.

Figure 7:
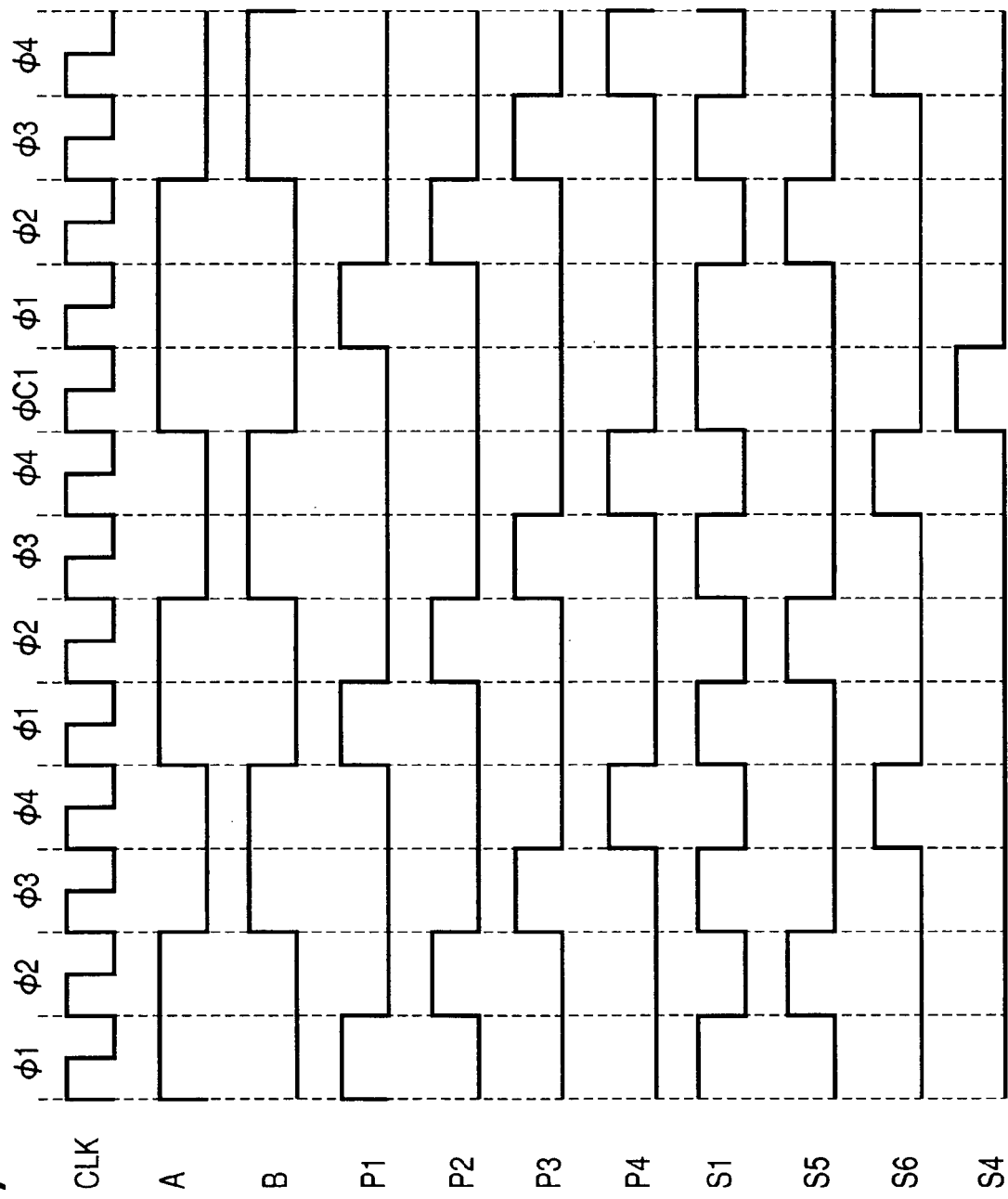
FIG. 7 is a time chart of carrier signals and operating timing signals generated by a timing generator illustrated in FIG. 6.

The timing generator 60A is operatively configured to generate operating timing signals (pulse signals) A, B, S1, S4, S5, and S6 based on the clock signal CLK (see FIG. 7).

The operating timing signal A with its high level allows the first selector 61 to operate so as to electrically conduct between the first sensor element 10A and the inverting terminal of the first differential amplifier 22. In addition, the operating timing signal A with its high level allows the third selector 63 to operate so as to electrically conduct between the first amplifier 40A and the ninth sample and hold circuit 51$c$1.

The operating timing signal B with its high level allows the second selector 62 to operate so as to electrically conduct between the second sensor element 10B and the inverting terminal of the first differential amplifier 22. In addition, the operating timing signal B with its high level allows the fourth selector 64 to operate so as to electrically conduct between the second amplifier 40B and the ninth sample and hold circuit 51c1.

The operating timing signal S1 with its high level allows the switch 26 to close. In contrast, the operating timing signal S1 with its low level permits the switch 26 to open.

Operations of the capacitive acceleration sensor CA2 will be described hereinafter with reference to a time chart of the signals A, B, P1 to P4, S1, and S4 to S5 illustrated in FIG. 7.

Each of the first to fourth carrier signals P1 to P4 alternates between a high level state and a low level state at predetermined periods corresponding to first to fifth periods (φ1, φ2, φ3, φ4, and φC1) of the clock signal CLK. The second carrier signal P2 is an inversion of the first carrier signal P1 in voltage level, and the fourth carrier signal P4 is an inversion of the third carrier signal P3 in voltage level.

In the third embodiment, the first to fourth periods φ1 to φ4 are allocated to detect variations of the capacitances of the paired capacitors of each differential capacitor of one of the first and second sensor element 10A and 10B. The fifth period φC allows the ninth sample and hold circuit 51c1 to hold correction values for the operating characteristics of the first and second amplifiers 40A and 40B.

Similarly, each of the operating timing signals S4 to S6 alternates between a high level state and a low level state at the fifth, second, and fourth periods (φC1, φ4, and φ2) of the clock signal CLK. The polarity of the operating timing signal S5 is equal to that of the second carrier signal P2.

Specifically, the operating timing signal S5 with its high level allows the fifth sample and hold circuit 31α1 and the eighth sample and hold circuit 51a1 to operate, and the operating timing signal S6 with its high level allows the seventh sample and hold circuit 31β1 and the tenth sample and hold circuit 51b1 to operate. In addition, the operating timing signal S4 with its high level allows the sixth sample and hold circuit 31γ1 and the ninth sample and hold circuit 51c1 to operate.

Operations of the capacitive acceleration sensor CA2 can be changed between a normal mode during each of the first to fourth periods φ1 to φ4 and a correction value holding mode during each fifth period φC1.

First, operations of the sensor CA2 in the correction value holding mode for causing the sixth sample and hold circuit 31γ1 to hold the correction values for the operating characteristics of the C-V converter 20 and for causing the ninth sample and hold circuit 51c1 to hold the correction values for the operating characteristics of each of the first and second amplifiers 40A and 40B during each fifth period φC1 will be described hereinafter.

During each fifth period φC1, all of the first to fourth carrier signals P1 to P4 are in their low level states. During each fifth period φC1, the timing signal S1 with its high level allows the switch 26 to be kept closed, and the timing signal S4 with its high level permits the sixth sample and hold circuit 31γ1 and the ninth sample and hold circuit 51c1 to operate. In addition, the timing signal A with its high level permits the first selector 61 and the third selector 63 to be turned on, so that the first sensor element 10A and the inverting terminal of the first differential amplifier 22 are electrically conducted, and the first amplifier 40A and the ninth sample and hold circuit 51c1 are electrically conducted.

The closed state of the switch 26 permits the inverting terminal of the first differential amplifier 22 to short-circuit to the output terminal thereof, which results in that the first differential amplifier 22 operates as a voltage follower (impedance converter). This causes the voltage VN (V/2) applied to the noninverting terminal of the amplifier 22 to be output from the amplifier 22 through the output terminal thereof.

The timing signal S4 sent from the timing generator 60A with its high level during each period φC permits the sixth sample and hold circuit 31γ1 to sample and hold the voltage VN (V/2) outputted from the amplifier 22. Thereafter, the voltage VN (V/2) is amplified by the frist amplifier 40A so that an amplified voltage is outputted from the first amplifier 40A. The output voltage from the first amplifier 40A is sent to the sixth sample and hold circuit 51c1 through the third selector 63 to be sampled and held thereby.

Next, operations of the sensor CA2 in the normal mode during each of the first to fourth periods φ1 to φ4 will be described hereinafter.

First, operations of the sensor CA2 when the first sensor element 10A is selected by the first and third selectors 61 and 63 during the timing signal A with its high level will be described hereinafter.

During each first period φ1, the first carrier signal P1 is in its high level state, but the second carrier signal P2 is in its low level state. During each first period φ1, the timing signal S1 with its high level allows the switch 26 to be kept closed. In the state of the sensor CA2 during each period φ1, the voltage VN (V/2) is applied to the noninverting terminal of the amplifier 22 to be outputted through the output terminal thereof. The closed state of the switch 26 permits the output voltage V/2 from the amplifier 22 to be fed back to the inverting input terminal thereof and to be applied to the movable electrodes 11a and 11b (see FIG. 5) of each differential capacitor of the first sensor element 10A. The voltage of the movable electrodes 11a and 11b of each differential capacitor is clamped to the voltage V/2.

In addition, the first carrier signal P1 with the voltage level of V applied to the fixed electrode 12a of each differential capacitor causes a voltage "V/2" to be applied to the movable electrodes 11a and 11b. Because the switch 26 is kept closed, charges charged in the capacitor 24 are discharged.

After each first period φ1, during each second period φ2, the first carrier signal P1 is in its low level state, but the second carrier signal P2 is in its high level state. During each second period φ2, the timing signal S1 with its low level allows the switch 26 to be kept opened, and the timing signal S2 with its high level is applied to the fifth sample and hold circuit 31α1.

In the state of the sensor CA2 during each period φ2, the second carrier signal P2 with the voltage level of V applied to the fixed electrode 12b of each differential capacitor causes a voltage "V/2" to be applied to the movable electrodes 11a and 11b. Because the switch 26 remains opened, the capacitor 24 is charged.

As described in the first embodiment, during each second period φ2, the voltage depending on the capacitance difference "C1−C2" appears at the output terminal of the first differential amplifier 22. Note that the differential capacitance C1 is a capacitance between the movable electrode 11a and the fixed electrode 12a of each differential capacitor, and the differential capacitance C2 is a capacitance between the movable electrode 11b and the fixed electrode 12b of each differential capacitor.

The voltage depending on the capacitance difference "C1–C2" is sampled by the fifth sample and hold circuit 31α1 during each second period φ2, and the sampled voltage is held thereby.

In the third embodiment, like the second embodiment, the fourth differential amplifier 34A calculates the different voltage between the voltage held by the fifth sample and hold circuit 31α1 and the correction value (voltage) held by the sixth sample and hold circuit 31γ1. The different voltage is amplified by the first amplifier 40A so that the output voltage is sampled to be held by the eighth sample and hold circuit 51a1.

Like the first embodiment, the sixth differential amplifier 54A calculates the difference voltage between the voltage held by the eighth sample and hold circuit 51a1 and the correction voltage held by the ninth sample and hold circuit 51c1. Predetermined components of the different voltage are allowed to pass through the first filter amplifier 70A so that the predetermined components of the different voltage are outputted from the output terminal OUT1 as an acceleration detection signal of the first sensor element 10A.

Next, operations of the sensor CA2 when the second sensor element 10B is selected by the second and fourth selectors 62 and 64 during the timing signal B with its high level will be described hereinafter.

During each third period φ3, the third carrier signal P3 is in its high level state, but the fourth carrier signal P4 is in its low level state. During each third period φ3, the timing signal S1 with its high level allows the switch 26 to be kept closed. In the state of the sensor CA2 during each period φ1, the voltage VN (V/2) is applied to the noninverting terminal of the amplifier 22 to be outputted through the output terminal thereof. The closed state of the switch 26 permits the output voltage V/2 from the amplifier 22 to be fed back to the inverting input terminal thereof and to be applied to the movable electrodes 11c and 11d (see FIG. 5) of each differential capacitor of the second sensor element 10B. The voltage of the movable electrodes 11c and 11d of each differential capacitor is clamped to the voltage V/2.

In addition, the third carrier signal P3 with the voltage level of V applied to the fixed electrode 12c of each differential capacitor causes a voltage "V/2" to be applied to the movable electrodes 11c and 11d. Because the switch 26 is kept closed, charges charged in the capacitor 24 are discharged.

After each first period φ3, during each fourth period φ4, the third carrier signal P1 is in its low level state, but the fourth carrier signal P4 is in its high level state. During each fourth period φ4, the timing signal S1 with its low level allows the switch 26 to be kept opened, and the timing signal S6 with its high level is applied to the seventh sample and hold circuit 31β1.

In the state of the sensor CA2 during each fourth period φ4, the fourth carrier signal P4 with the voltage level of V applied to the fixed electrode 12d of each differential capacitor causes a voltage "V/2" to be applied to the movable electrodes 11c and 11d. Because the switch 26 remains opened, the capacitor 24 is charged.

As described in the first embodiment, during each fourth period φ4, the voltage depending on the capacitance difference "C3–C4" appears at the output terminal of the first differential amplifier 22. Note that the differential capacitance C3 is a capacitance between the movable electrode 11c and the fixed electrode 12c of each differential capacitor, and the differential capacitance C4 is a capacitance between the movable electrode 11d and the fixed electrode 12d of each differential capacitor.

The voltage depending on the capacitance difference "C3–C4" is sampled by the seventh sample and hold circuit 31β1 during each fourth period φ4, and the sampled voltage is held thereby.

The fifth differential amplifier 34B calculates the different voltage between the voltage held by the seventh sample and hold circuit 31β1 and the correction value (voltage) held by the sixth sample and hold circuit 31γ1. The different voltage is amplified by the second amplifier 40B so that the output voltage is sampled to be held by the tenth sample and hold circuit 51b1.

The seventh differential amplifier 54B calculates the difference voltage between the voltage held by the tenth sample and hold circuit 51b1 and the correction voltage held by the ninth sample and hold circuit 51c1. Predetermined components of the different voltage are allowed to pass through the second filter amplifier 70B so that the predetermined components of the different voltage are outputted from the output terminal OUT2 as an acceleration detection signal of the second sensor element 10B.

In the capacitive acceleration sensor CA2 according to the third embodiment, in the correction value holding mode, the closed state of the switch 26 allows the inverting input terminal and the output terminal of the first differential amplifier 22 to short-circuit each other. This causes the first differential amplifier 22 to output the constant voltage VN (=V/2) to the sixth sample and hold circuit 31γ1 to be sampled and held thereby as the correction value. The held voltage by the sixth sample and hold circuit 31γ1 is amplified by the first amplifier 40A or the second amplifier 40B so that the amplified voltage is sampled to be held by the ninth sample and hold circuit 51c1 as the correction value. The correction value held by the ninth sample and hold circuit 51c1 is expressed by "V/2+Vg"; this "Vg" represents voltage increases based on the amplification of the first amplifier 40A or the second amplifier 40B.

On the other hand, in the normal mode, during the timing signal A is in its high level, the voltage depending on the capacitance difference "C1–C2" is outputted from the first sensor element 10A through the first differential amplifier 22 while the switch 26 is kept opened.

The output voltage is sampled to be held by the fifth sample and hold circuit 31α1.

The fourth differential amplifier 34A calculates the different voltage between the voltage held by the fifth sample and hold circuit 31α1 and the correction value (voltage) held by the sixth sample and hold circuit 31γ1. The different voltage is amplified by the first amplifier 40A so that the output voltage is sampled to be held by the eighth sample and hold circuit 51a1. The sixth differential amplifier 54A calculates the difference voltage between the voltage held by the eighth sample and hold circuit 51a1 and the correction voltage held by the ninth sample and hold circuit 51c1.

Similarly, in the normal mode, during the timing signal B is in its high level, the voltage depending on the capacitance difference "C3–C4" is outputted from the second sensor element 10B through the first differential amplifier 22 while the switch 26 is kept opened.

The output voltage is sampled to be held by the seventh sample and hold circuit 31β1.

The fifth differential amplifier 34B calculates the different voltage between the voltage held by the seventh sample and hold circuit 31β1 and the correction value (voltage) held by the sixth sample and hold circuit 31γ1. The different voltage is amplified by the second amplifier 40B so that the output voltage is sampled to be held by the tenth sample and hold circuit 51b1. The seventh differential amplifier 543 calculates the difference voltage between the voltage held by the tenth sample and hold circuit 51*b*1 and the correction voltage held by the ninth sample and hold circuit 51*c*1.

As described above, in the third embodiment, it is possible for the fourth differential amplifier 34A to cancel components contained in the voltage outputted from the first sensor element 10A through the C-V converter 20 and affected by the operations of the C-V converter 20. In addition, in the third embodiment, it is possible for the sixth differential amplifier 54A to cancel the voltage Vg corresponding to the voltage increases based on the amplification of the first amplifier 40A from the voltage depending on the capacitance difference "C1–C2".

Similarly, in the third embodiment, it is possible for the fifth differential amplifier 34B to cancel components contained in the voltage outputted from the second sensor element 10B through the C-V converter 20 and affected by the operations of the C-V converter 20. In addition, in the third embodiment, it is possible for the seventh differential amplifier 54B to cancel the voltage Vg corresponding to the voltage increases based on the amplification of the second amplifier 40B from the voltage depending on the capacitance difference "C3–C4".

Even if the operating characteristics of the C-V converter 20 and/or each of the amplifiers 40A and 40B deteriorate over time, it is possible to make the sensor CA2 operate with little influence from age deterioration of the operating characteristics of the C-V converter 20 and/or each of the amplifiers 40A and 40B.

For the reasons mentioned above, even if the operating characteristics of the C-V converter 20 and/or each of the amplifiers 40A and 40B vary depending on change in ambient temperature, it is possible to cause the capacitive acceleration sensor CA2 to operate with little influence from the variation of operating characteristics of the C-V converter 20 and/or each of the amplifiers 40A and 40B depending on change in ambient temperature.

In the third embodiment, the first sensor element 10A and the second sensor element 10B can share the sixth sample and hold circuit 31$\gamma$1 and the ninth sample and hold circuit 51*c*1, making it possible to simplify the circuit structure of the capacitive acceleration sensor CA2.

In the third embodiment, the ninth sample and hold circuit 51*c*1 holds the correction value for the operation characteristics of the first amplifier 40A, but it can hold the correction value for the operation characteristics of the second amplifier 40B.

Fourth Embodiment

Figure 8:
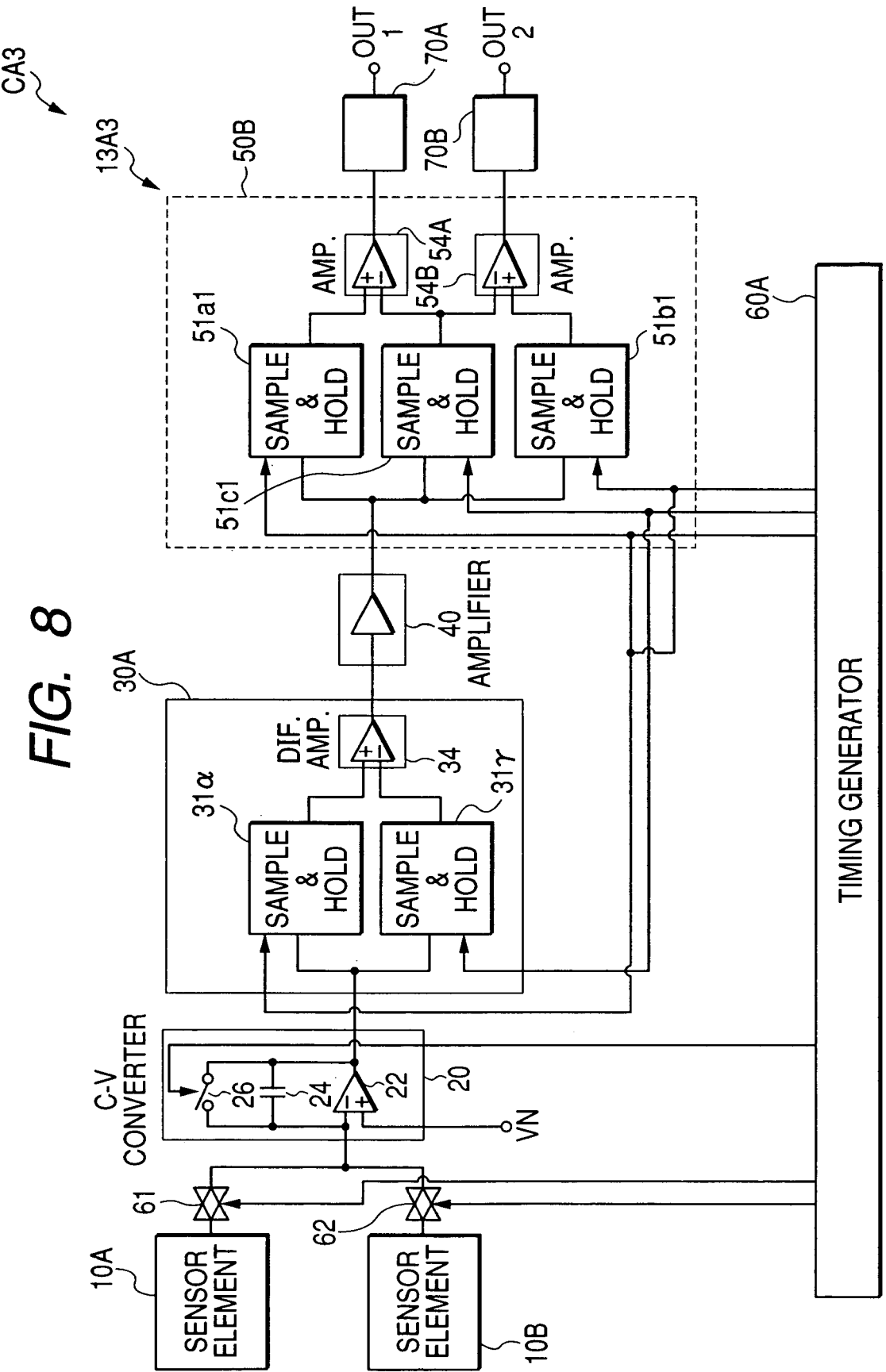
FIG. 8 is a circuit diagram of the capacitive acceleration sensor according to a fourth embodiment of the invention.

FIG. 8 illustrates an example of the circuit structure of a capacitive acceleration sensor CA3 according to a fourth embodiment of the present invention. Note that elements of the capacitive acceleration sensor CA3 according to the fourth embodiment, which are substantially identical to those of the capacitive acceleration sensor according to the third embodiment shown in FIGS. 5 and 6, are represented by the same reference characters as in FIGS. 5 and 6. Therefore, the descriptions of the elements of the capacitive semiconductor sensor CA3 according to the fourth embodiment are omitted or simplified.

An acceleration detection circuit 13A3 according to the fourth embodiment is provided with the sample and hold circuit 30A in place of the sample and hold circuit 30B. The structure of the sample and hold circuit 30A has been illustrated in FIG. 4. In addition, the acceleration detection circuit 13A3 is provided with the amplifier 40 in place of the first and second amplifiers 40A and 40B. Specifically, the output terminal of the third differential amplifier 34 is electrically connected to the amplifier 40.

Moreover, the acceleration detection circuit 13A3 is provided with a self-correcting circuit 50B in place of the self-correcting circuit 50A. The self-correcting circuit 50B has substantially the same structure as the self-correcting circuit 50A except for the third and fourth selectors 63 and 64 are omitted. Specifically, the output terminal of the amplifier 40 is electrically connected to each of the eighth, ninth, and tenth sample and hold circuits 51*a*1, 51*c*1, and 51*b*1.

In the capacitive acceleration sensor CA3 according to the fourth embodiment, in the correction value holding mode, the closed state of the switch 26 allows the inverting input terminal and the output terminal of the first differential amplifier 22 to short-circuit each other. This causes the first differential amplifier 22 to output the constant voltage VN (=V/2) to the fourth sample and hold circuit 31$\gamma$ to be sampled and held thereby as the correction value. The held voltage by the fourth sample and hold circuit 31$\gamma$ is amplified by the amplifier 40 so that the amplified voltage is sampled to be held by the ninth sample and hold circuit 51*c*1 as the correction value. The correction value held by the ninth sample and hold circuit 51*c*1 is expressed by "V/2+ Vg"; this "Vg" represents voltage increases based on the amplification of the amplifier 40.

On the other hand, in the normal mode, during the timing signal A is in its high level, the voltage depending on the capacitance difference "C1–C2" is outputted from the first sensor element 10A through the first differential amplifier 22 while the switch 26 is kept opened.

The output voltage is sampled to be held by the third sample and hold circuit 31$\alpha$.

The third differential amplifier 34 calculates the different voltage between the voltage held by the third sample and hold circuit 31$\alpha$ and the correction value (voltage) held by the fourth sample and hold circuit 31$\gamma$. The different voltage is amplified by the amplifier 40 so that the output voltage is sampled to be held by the eighth sample and hold circuit 51*a*1. The sixth differential amplifier 54A calculates the difference voltage between the voltage held by the eighth sample and hold circuit 51*a*1 and the correction voltage held by the ninth sample and hold circuit 51*c*1.

Similarly, in the normal mode, while the timing signal B is in its high level, the voltage depending on the capacitance difference "C3–C4" is outputted from the second sensor element 10B through the first differential amplifier 22 while the switch 26 is kept opened.

The output voltage is sampled to be held by the third sample and hold circuit 31$\alpha$.

The third differential amplifier 34 calculates the different voltage between the voltage held by the third sample and hold circuit 31$\alpha$ and the correction value (voltage) held by the fourth sample and hold circuit 31$\gamma$. The different voltage is amplified by the amplifier 40 so that the output voltage is sampled to be held by the tenth sample and hold circuit 51*b*1. The seventh differential amplifier 54B calculates the difference voltage between the voltage held by the tenth sample and hold circuit 51*b*1 and the correction voltage held by the ninth sample and hold circuit 51*c*1.

As described above, in the fourth embodiment, it is possible for the third differential amplifier 34 to cancel components contained in the voltage outputted from the first sensor element 10A through the C-V converter 20 and affected by the operations of the C-V converter 20. In addition, in the fourth embodiment, it is possible for the sixth differential amplifier 54A to cancel the voltage Vg corresponding to the voltage increases based on the amplification of the amplifier 40 from the voltage depending on the capacitance difference "C1–C2".

Similarly, in the fourth embodiment, it is possible for the third differential amplifier 34 to cancel components contained in the voltage outputted from the second sensor element 10B through the C-V converter 20 and affected by the operations of the C-V converter 20. In addition, in the fourth embodiment, it is possible for the seventh differential amplifier 54B to cancel the voltage Vg corresponding to the voltage increases based on the amplification of the second amplifier 40B from the voltage depending on the capacitance difference "C3–C4".

Even if the operating characteristics of the C-V converter 20 and/or the amplifier 40 deteriorate over time, it is possible to make the capacitive acceleration sensor CA3 operate with little influence from age deterioration of the operating characteristics of the C-V converter 20 and/or the amplifier 40.

For the reasons mentioned above, even if the operating characteristics of the C-V converter 20 and/or the amplifier 40 vary depending on change in ambient temperature, the capacitive acceleration sensor CA3 can operate with little influence from the variation of operating characteristics of the C-V converter 20 and/or the amplifier 40 depending on change in ambient temperature.

In the fourth embodiment, the first sensor element 10A and the second sensor element 10B can share the third sample and hold circuit 31α, the fourth sample and hold circuit 31γ, the amplifier 40, and the ninth sample and hold circuit 51c1, making it possible to simplify the circuit structure of the capacitive acceleration sensor CA3.

Fifth Embodiment

Figure 9:
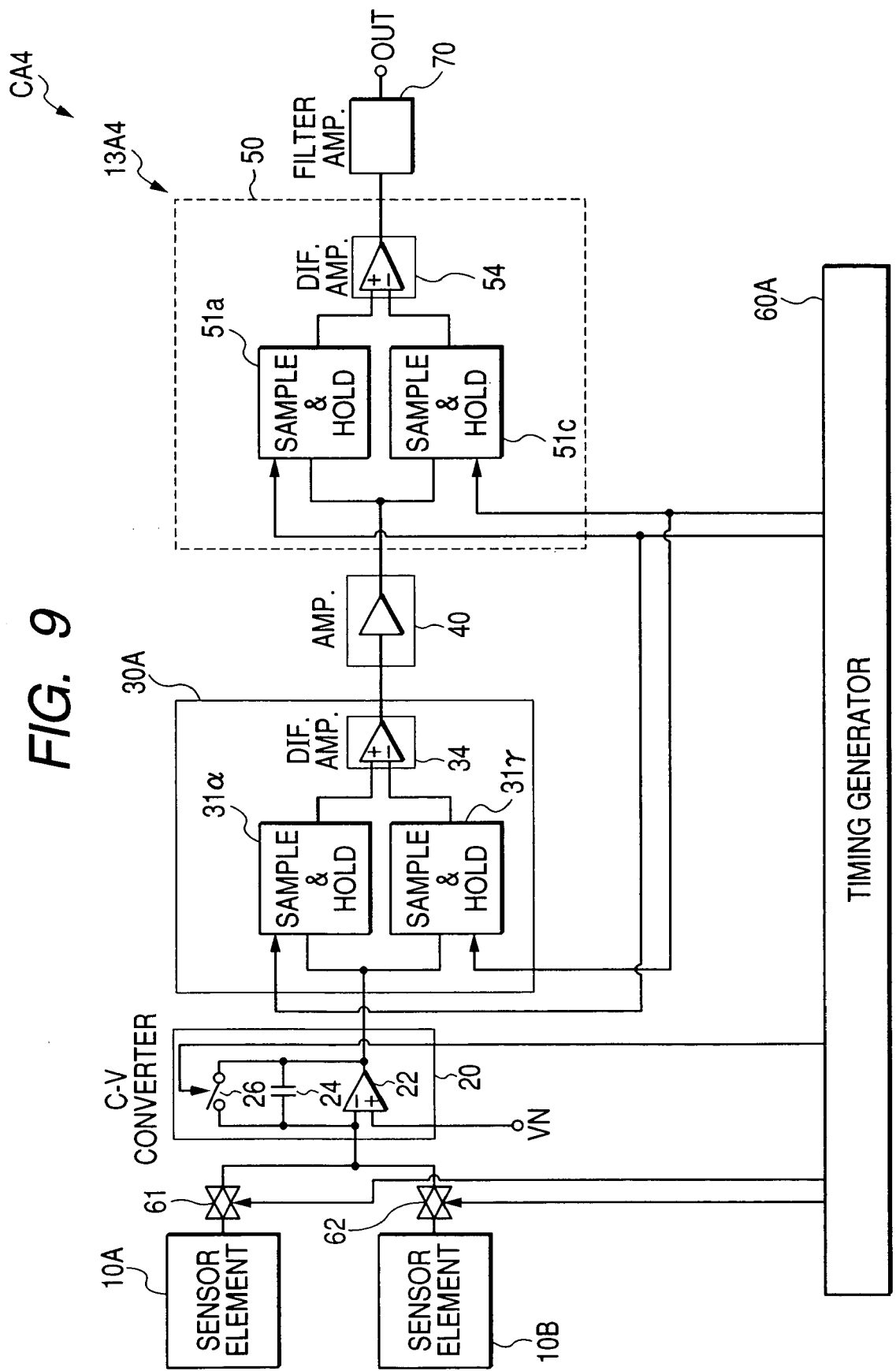
FIG. 9 is a circuit diagram of the capacitive acceleration sensor according to a fifth embodiment of the invention.
Figure 10:
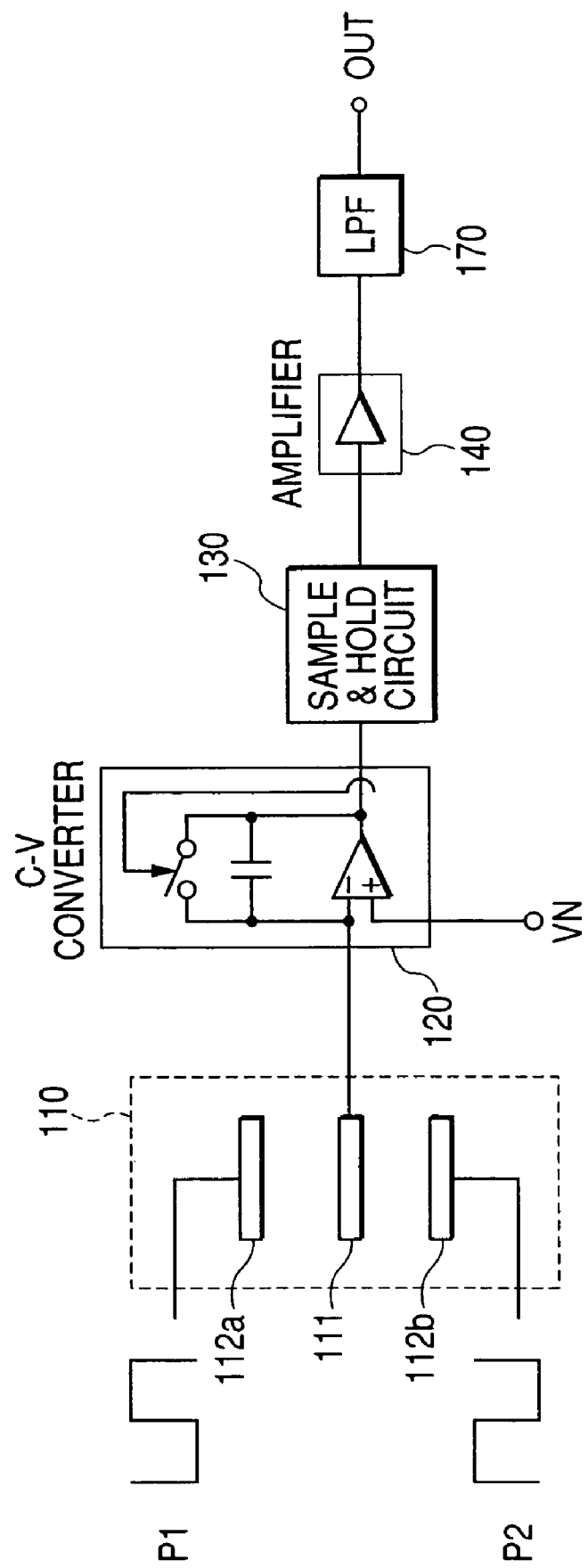
FIG. 10 is a circuit diagram of a conventional capacitive acceleration sensor.

FIG. 9 illustrates an example of the circuit structure of a capacitive acceleration sensor CA4 according to a fifth embodiment of the present invention. Note that elements of the capacitive acceleration sensor CA4 according to the fifth embodiment, which are substantially identical to those of the capacitive acceleration sensor according to the fourth embodiment shown in FIG. 8, are represented by the same reference characters as in FIG. 8. Therefore, the descriptions of the elements of the capacitive semiconductor sensor CA4 according to the fifth embodiment are omitted or simplified.

An acceleration detection circuit 13A4 according to the fifth embodiment is provided with the self-correcting circuit 50 in place of the self-correcting circuit 50B. The structure of the self correcting circuit 50 has been illustrated in FIG. 2.

In the capacitive acceleration sensor CA 4 according to the fifth embodiment, in the correction value holding mode, the closed state of the switch 26 allows the inverting input terminal and the output terminal of the first differential amplifier 22 to short-circuit each other. This causes the first differential amplifier 22 to output the constant voltage VN (=V/2) to the fourth sample and hold circuit 31γ to be sampled and held thereby as the correction value. The held voltage by the fourth sample and hold circuit 31γ is amplified by the amplifier 40 so that the amplified voltage is sampled to be held by the second sample and hold circuit 51c as the correction value. The correction value held by the second sample and hold circuit 51c1 is expressed by "V/2+Vg"; this "Vg" represents voltage increases based on the amplification of the amplifier 40.

On the other hand, in the normal mode, during the timing signal A is in its high level, the voltage depending on the capacitance difference "C1–C2" is outputted from the first sensor element 10A through the first differential amplifier 22 while the switch 26 is kept opened.

The output voltage is sampled to be held by the third sample and hold circuit 31α.

The third differential amplifier 34 calculates the different voltage between the voltage held by the third sample and hold circuit 31α and the correction value (voltage) held by the fourth sample and hold circuit 31γ. The different voltage is amplified by the amplifier 40 so that the output voltage is sampled to be held by the first sample and hold circuit 51a. The second differential amplifier 54 calculates the difference voltage between the voltage held by the first sample and hold circuit 51a and the correction voltage held by the second sample and hold circuit 51c.

Similarly, in the normal mode, during the timing signal B is in its high level, the voltage depending on the capacitance difference "C3–C4" is outputted from the second sensor element 10B through the first differential amplifier 22 while the switch 26 is kept opened.

The output voltage is sampled to be held by the third sample and hold circuit 31α.

The third differential amplifier 34 calculates the different voltage between the voltage held by the third sample and hold circuit 31α and the correction value (voltage) held by the fourth sample and hold circuit 31γ. The different voltage is amplified by the amplifier 40 so that the output voltage is sampled to be held by the first sample and hold circuit 51a. The second differential amplifier 54 calculates the difference voltage between the voltage held by the first sample and hold circuit 51a and the correction voltage held by the second sample and hold circuit 51c.

As described above, in the fifth embodiment, it is possible for the third differential amplifier 34 to cancel components contained in the voltage outputted from the first sensor element 10A through the C-V converter 20 and affected by the operations of the C-V converter 20. In addition, in the fifth embodiment, it is possible for the second differential amplifier 54 to cancel the voltage Vg corresponding to the voltage increases based on the amplification of the amplifier 40 from the voltage depending on the capacitance difference "C1–C2".

Similarly, in the fifth embodiment, it is possible for the third differential amplifier 34 to cancel components contained in the voltage outputted from the second sensor element 10B through the C-V converter 20 and affected by the operations of the C-V converter 20. In addition, in the fifth embodiment, it is possible for the second differential amplifier 54 to cancel the voltage Vg corresponding to the voltage increases based on the amplification of the second amplifier 40B from the voltage depending on the capacitance difference "C3–C4".

Even if the operating characteristics of the C-V converter 20 and/or the amplifier 40 deteriorate over time, it is possible to make the capacitive acceleration sensor CA4 operate with little influence from age deterioration of the operating characteristics of the C-V converter 20 and/or the amplifier 40.

For the reasons mentioned above, even if the operating characteristics of the C-V converter 20 and/or the amplifier 40 vary depending on change in ambient temperature, the capacitive acceleration sensor CA4 can operate with little influence from the variation of operating characteristics of the C-V converter 20 and/or the amplifier 40 depending on change in ambient temperature.

In the fifth embodiment, the first sensor element 10A and the second sensor element 103 can share the third sample and hold circuit 31α, the fourth sample and hold circuit 31γ, the amplifier 40, the first sample and hold circuit 51a, and the second sample and hold circuit 51c, making it possible to simplify the circuit structure of the capacitive acceleration sensor CA4.

In each of the first to fifth embodiments and their modifications, the present invention is applied to capacitive acceleration sensors for detecting an acceleration of a vehicle, but the present invention can be applied to capacitive physical quantity sensor for detecting physical quantities including an angular rate, a yaw rate, a pressure, or the like of a target.

While there has been described what is at present considered to be these embodiments and modifications of the present invention, it will be understood that various modifications which are not described yet may be made therein, and it is intended to cover in the appended claims all such modifications as fall within the true spirit and scope of the invention.

What is claimed is:

1. A capacitive physical quantity sensor comprising:
   a sensor element having a movable electrode and a fixed electrode opposite to the movable electrode, the movable electrode being displacable depending on change of a physical quantity;
   a C-V converter configured to convert a variation in a capacitance between the movable electrode and the fixed electrode into a voltage to output the converted voltage in a first operating mode, the C-V converter being configured to output a constant voltage in a second operating mode;
   an amplifier connected to the C-V converter and configured to amplify the converted voltage to output an amplified first voltage, the amplifier being configured to amplify the constant voltage to output an amplified second voltage;
   a first sample and hold circuit connected to the amplifier and configured to operate in the first operating mode to sample and hold the first voltage outputted from the amplifier;
   a second sample and hold circuit connected to the amplifier and configured to operate in the second operating mode to sample and hold the second voltage outputted from the amplifier; and
   a first differential amplifier connected to the first and second sample and hold circuits and configured to obtain a difference voltage between the first voltage held by the first sample and hold circuit and the second voltage held by the second sample and hold circuit.

2. A capacitive physical quantity sensor according to claim 1, wherein the C-V converter comprises:
   a second differential amplifier with first and second input terminals and an output terminal, the first input terminal being connected to the movable electrode, the second differential amplifier being configured such that the constant voltage being applied to the second input terminal;
   a capacitor connected to the first input terminal and the output terminal of the second differential amplifier;
   a switch connected to the first input terminal and the output terminal of the second differential amplifier in parallel to the capacitor and configured to open and close, and wherein the switch is kept opened in the first operating mode, and the switch is kept closed in the second operating mode so that the first input terminal and the output terminal of the second differential amplifier are short-circuited to each other.

3. A capacitive physical quantity sensor according to claim 1, further comprising a filter connected to the first differential amplifier and configured to allow components contained in the difference voltage to pass therethrough, the components being within a predetermined frequency band.

4. A capacitive physical quantity sensor according to claim 1, wherein a first pulse signal and a second pulse signal are configured to be alternately applied to the fixed electrode, the first operating mode corresponds to a predetermined first period of time during which the n-th power of a predetermined number of the first and second pulse signals is applied to the fixed electrode, the n being a positive integer, the second operating mode corresponds to a predetermined second period of time, and the second period of time occurs once every the first period of time.

5. A capacitive physical quantity sensor comprising:
   a sensor element having a movable electrode and a fixed electrode opposite to the movable electrode, the movable electrode being displacable depending on change of a physical quantity;
   a C-V converter configured to convert a variation in a capacitance between the movable electrode and the fixed electrode into a voltage to output the converted voltage in a first operating mode, the C-V converter being configured to output a constant voltage in a second operating mode;
   a first sample and hold circuit connected to the C-V converter and configured to operate in the first operating mode to sample and hold the converted voltage outputted from the C-V converter;
   a second sample and hold circuit connected to the C-V converter and configured to operate in the second operating mode to sample and hold the constant voltage outputted from the C-V converter;
   a first differential amplifier connected to the first and second sample and hold circuits and configured to output the constant voltage outputted from the C-V converter in the second operating mode, the second differential amplifier being configured to obtain a difference voltage between the converted voltage held by the first sample and hold circuit and the constant voltage held by the second sample and hold circuit in the first operating mode;
   an amplifier connected to the first differential amplifier and configured to amplify the difference voltage to output an amplified first voltage, the amplifier being configured to amplify the constant voltage to output an amplified second voltage;
   a third sample and hold circuit connected to the amplifier and configured to sample and hold the first voltage outputted from the amplifier;
   a fourth sample and hold circuit connected to the amplifier and configured to sample and hold the second voltage outputted from the amplifier; and
   a second differential amplifier connected to the third and fourth sample and hold circuits and configured to obtain a difference between the first voltage held by the third sample and hold circuit and the second voltage held by the fourth sample and hold circuit.

6. A capacitive physical quantity sensor according to claim 5, wherein the C-V converter comprises:
   a third differential amplifier with first and second input terminals and an output terminal, the first input terminal being connected to the movable electrode, the third differential amplifier being configured such that the constant voltage being applied to the second input terminal;

a capacitor connected to the first input terminal and the output terminal of the third differential amplifier;

a switch connected to the first input terminal and the output terminal of the third differential amplifier in parallel to the capacitor and configured to open and close, and wherein the switch is kept opened in the first operating mode, and the switch is kept closed in the second operating mode so that the first input terminal and the output terminal of the third differential amplifier are short-circuited to each other.

7. A capacitive physical quantity sensor according to claim 5, further comprising a filter connected to the second differential amplifier and configured to allow components contained in the difference obtained by the second differential amplifier to pass therethrough, the components being within a predetermined frequency band.

8. A capacitive physical quantity sensor according to claim 5, wherein a first pulse signal and a second pulse signal are configured to be alternately applied to the fixed electrode, the first operating mode corresponds to a predetermined first period of time during which the n-th power of a predetermined number of the first and second pulse signals are applied to the fixed electrode, the n being a positive integer, the second operating mode corresponds to a predetermined second period of time, and the second period of time occurs once every the first period of time.

9. A capacitive physical quantity sensor comprising:
a first sensor element having a first movable electrode and a first fixed electrode opposite to the first movable electrode, the first movable electrode being displacable depending on change of a first physical quantity;
a second sensor element having a second movable electrode and a second fixed electrode opposite to the second movable electrode, the second movable electrode being displacable depending on change of a second physical quantity;
a C-V converter configured to convert a variation in one of a capacitance between the first movable electrode and the first fixed electrode of the first sensor element and that between the second movable electrode and the second fixed electrode of the second sensor element into a voltage to output the converted voltage in a first operating mode, the C-V converter being configured to output a constant voltage in a second operating mode;
a first sample and hold circuit connected to the C-V converter and configured to operate in the first operating mode to sample and hold the converted voltage outputted from the C-V converter based on the capacitance of the first sensor element;
a second sample and hold circuit connected to the C-V converter and configured to operate in the first operating mode to sample and hold the converted voltage outputted from the C-V converter based on the capacitance of the second sensor element;
a third sample and hold circuit connected to the C-V converter and configured to operate in the second operating mode to sample and hold the constant voltage outputted from the C-V converter;
a first differential amplifier connected to the first and third sample and hold circuits and configured to obtain a first difference voltage between the converted voltage held by the first sample and hold circuit and the constant voltage held by the third sample and hold circuit in the first operating mode;
a second differential amplifier connected to the second and third sample and hold circuits and configured to obtain a second difference voltage between the converted voltage held by the second sample and hold circuit and the constant voltage held by the third sample and hold circuit in the first operating mode, one of the first and second differential amplifiers being configured to output the constant voltage outputted from the C-V converter in the second operating mode;
a first amplifier connected to the first differential amplifier and configured to amplify the first difference voltage to output an amplified first voltage;
a second amplifier connected to the second differential amplifier and configured to amplify the second difference voltage to output an amplified second voltage, one of the first and second amplifiers being configured to amplify the constant voltage to output an amplified third voltage;
a fourth sample and hold circuit connected to the first amplifier and configured to sample and hold the first voltage outputted from the first amplifier;
a fifth sample and hold circuit connected to the second amplifier and configured to sample and hold the second voltage outputted from the second amplifier;
a sixth sample and hold circuit connected to at least corresponding one of the first amplifier and the second amplifier and configured to sample and hold the third voltage outputted from one of the first and second amplifiers;
a third differential amplifier connected to the fourth and sixth sample and hold circuits and configured to obtain a difference between the first voltage held by the fourth sample and hold circuit and the third voltage held by the sixth sample and hold circuit; and
a fourth differential amplifier connected to the fifth and sixth sample and hold circuits and configured to obtain a difference between the second voltage held by the fifth sample and hold circuit and the third voltage held by the sixth sample and hold circuit.

10. A capacitive physical quantity sensor according to claim 9, wherein the C-V converter comprises:
a fifth differential amplifier with first and second input terminals and an output terminal, the first input terminal being connected to the first and second movable electrodes, the fifth differential amplifier being configured such that the constant voltage being applied to the second input terminal;
a capacitor connected to the first input terminal and the output terminal of the fifth differential amplifier;
a switch connected to the first input terminal and the output terminal of the fifth differential amplifier in parallel to the capacitor and configured to open and close, and wherein the switch is kept opened in the first operating mode, and the switch is kept closed in the second operating mode so that the first input terminal and the output terminal of the fifth differential amplifier are short-circuited to each other.

11. A capacitive physical quantity sensor according to claim 9, further comprising:
a first filter connected to the third differential amplifier and configured to allow components contained in the difference obtained by the third differential amplifier to pass therethrough, the components being within a predetermined frequency band, and
a second filter connected to the fourth differential amplifier and configured to allow components contained in the difference obtained by the fourth differential amplifier to pass therethrough, the components being within a predetermined frequency band.

12. A capacitive physical quantity sensor according to claim 9, wherein a first pulse signal and a second pulse signal are configured to be alternately applied to the first and second fixed electrodes, respectively, the first operating mode corresponds to a predetermined first period of time during which the n-th power of a predetermined number of the first and second pulse signals is applied to the first and second fixed electrodes, the n being a positive integer, the second operating mode corresponds to a predetermined second period of time, and the second period of time occurs once every the first period of time.

13. A capacitive physical quantity sensor comprising:
a first sensor element having a first movable electrode and a first fixed electrode opposite to the first movable electrode, the first movable electrode being displacable depending on change of a first physical quantity;
a second sensor element having a second movable electrode and a second fixed electrode opposite to the second movable electrode, the second movable electrode being displacable depending on change of a second physical quantity;
a C-V converter configured to convert a variation in one of a capacitance between the first movable electrode and the first fixed electrode of the first sensor element and that between the second movable electrode and the second fixed electrode of the second sensor element into a voltage to output the converted voltage in a first operating mode, the C-V converter being configured to output a constant voltage in a second operating mode;
a first sample and hold circuit connected to the C-V converter and configured to operate in the first operating mode to sample and hold the converted voltage outputted from the C-V converter based on the capacitance of one of the first sensor element and the second sensor element;
a second sample and hold circuit connected to the C-V converter and configured to operate in the second operating mode to sample and hold the constant voltage outputted from the C-V converter;
a first differential amplifier connected to the first and second sample and hold circuits and configured to obtain a difference voltage between the converted voltage held by the first sample and hold circuit and the constant voltage held by the second sample and hold circuit in the first operating mode, the first differential amplifier being configured to output the constant voltage outputted from the C-V converter in the second operating mode;
an amplifier connected to the first differential amplifier and configured to amplify the first difference voltage to output an amplified first voltage, the amplifier being configured to amplify the constant voltage to output an amplified second voltage;
a fourth sample and hold circuit connected to the amplifier and configured to sample and hold the first voltage outputted from the amplifier based on the capacitance of the first sensor element;
a fifth sample and hold circuit connected to the amplifier and configured to sample and hold the first voltage outputted from the amplifier based on the second sensor element;
a sixth sample and hold circuit connected to the amplifier and configured to sample and hold the second voltage outputted from the amplifier;
a second differential amplifier connected to the fourth and sixth sample and hold circuits and configured to obtain a difference between the first voltage held by the fourth sample and hold circuit and the second voltage held by the sixth sample and hold circuit; and
a third differential amplifier connected to the fifth and sixth sample and hold circuits and configured to obtain a difference between the first voltage held by the fifth sample and hold circuit and the second voltage held by the sixth sample and hold circuit.

14. A capacitive physical quantity sensor according to claim 13, wherein the C-V converter comprises:
a fourth differential amplifier with first and second input terminals and an output terminal, the first input terminal being connected to the first and second movable electrodes, the fourth differential amplifier being configured such that the constant voltage being applied to the second input terminal;
a capacitor connected to the first input terminal and the output terminal of the fourth differential amplifier;
a switch connected to the first input terminal and the output terminal of the fourth differential amplifier in parallel to the capacitor and configured to open and close, and wherein the switch is kept opened in the first operating mode, and the switch is kept closed in the second operating mode so that the first input terminal and the output terminal of the fourth differential amplifier are short-circuited to each other.

15. A capacitive physical quantity sensor according to claim 13, further comprising:
a first filter connected to the second differential amplifier and configured to allow components contained in the difference obtained by the second differential amplifier to pass therethrough, the components being within a predetermined frequency band, and
a second filter connected to the third differential amplifier and configured to allow components contained in the difference obtained by the third differential amplifier to pass therethrough, the components being within a predetermined frequency band.

16. A capacitive physical quantity sensor according to claim 13, wherein a first pulse signal and a second pulse signal are configured to be alternately applied to the first and second fixed electrodes, respectively, the first operating mode corresponds to a predetermined first period of time during which the n-th power of a predetermined number of the first and second pulse signals is applied to the first and second fixed electrodes, the n being a positive integer, the second operating mode corresponds to a predetermined second period of time, and the second period of time occurs once every the first period of time.

17. A capacitive physical quantity sensor comprising:
a first sensor element having a first movable electrode and a first fixed electrode opposite to the first movable electrode, the first movable electrode being displacable depending on change of a first physical quantity;
a second sensor element having a second movable electrode and a second fixed electrode opposite to the second movable electrode, the second movable electrode being displacable depending on change of a second physical quantity;
a C-V converter configured to convert a variation in one of a capacitance between the first movable electrode and the first fixed electrode of the first sensor element and that between the second movable electrode and the second fixed electrode of the second sensor element into a voltage to output the converted voltage in a first operating mode, the C-V converter being configured to output a constant voltage in a second operating mode;

a first sample and hold circuit connected to the C-V converter and configured to operate in the first operating mode to sample and hold the converted voltage outputted from the C-V converter based on the capacitance of one of the first sensor element and the second sensor element;

a second sample and hold circuit connected to the C-V converter and configured to operate in the second operating mode to sample and hold the constant voltage outputted from the C-V converter;

a first differential amplifier connected to the first and second sample and hold circuits and configured to obtain a difference voltage between the converted voltage held by the first sample and hold circuit and the constant voltage held by the second sample and hold circuit in the first operating mode, the first differential amplifier being configured to output the constant voltage outputted from the C-V converter in the second operating mode;

an amplifier connected to the first differential amplifier and configured to amplify the first difference voltage to output an amplified first voltage, the amplifier being configured to amplify the constant voltage to output an amplified second voltage;

a fourth sample and hold circuit connected to the amplifier and configured to sample and hold the first voltage outputted from the amplifier;

a fifth sample and hold circuit connected to the amplifier and configured to sample and hold the second voltage outputted from the amplifier; and a second differential amplifier connected to the fourth and fifth sample and hold circuits and configured to obtain a difference between the first voltage held by the fourth sample and hold circuit and the second voltage held by the fifth sample and hold circuit.

18. A capacitive physical quantity sensor according to claim 17, wherein the C-V converter comprises:

a third differential amplifier with first and second input terminals and an output terminal, the first input terminal being connected to the first and second movable electrodes, the third differential amplifier being configured such that the constant voltage being applied to the second input terminal;

a capacitor connected to the first input terminal and the output terminal of the third differential amplifier;

a switch connected to the first input terminal and the output terminal of the third differential amplifier in parallel to the capacitor and configured to open and close, and wherein the switch is kept opened in the first operating mode, and the switch is kept closed in the second operating mode so that the first input terminal and the output terminal of the third differential amplifier are short-circuited to each other.

19. A capacitive physical quantity sensor according to claim 17, further comprising:

a filter connected to the second differential amplifier and configured to allow components contained in the difference obtained by the second differential amplifier to pass therethrough, the components being within a predetermined frequency band.

20. A capacitive physical quantity sensor according to claim 17, wherein a first pulse signal and a second pulse signal are configured to be alternately applied to the first and second fixed electrodes, respectively, the first operating mode corresponds to a predetermined first period of time during which the n-th power of a predetermined number of the first and second pulse signals is applied to the first and second fixed electrodes, the n being a positive integer, the second operating mode corresponds to a predetermined second period of time, and the second period of time occurs once every the first period of time.

* * * * *